(12) United States Patent
Coleman et al.

(10) Patent No.: US 10,354,335 B2
(45) Date of Patent: *Jul. 16, 2019

(54) METHOD AND SYSTEM FOR ADMINISTERING LIFE INSURANCE PRODUCTS THROUGH CLASSIFYING INSURED LIVES TO ALLOCATE COSTS

(71) Applicant: Atlas Financial Partners LLC, New York, NY (US)

(72) Inventors: John Coleman, Norfolk, MA (US); Clifford Eisler, New York, NY (US)

(73) Assignee: Atlas Financial Partners LLC, New York, NY (US)

( * ) Notice: Subject to any disclaimer, the term of this patent is extended or adjusted under 35 U.S.C. 154(b) by 248 days.

This patent is subject to a terminal disclaimer.

(21) Appl. No.: 15/409,097

(22) Filed: Jan. 18, 2017

(65) Prior Publication Data

US 2017/0200233 A1    Jul. 13, 2017

Related U.S. Application Data

(63) Continuation of application No. 14/185,618, filed on Feb. 20, 2014, now abandoned, which is a continuation of application No. 13/797,386, filed on Mar. 12, 2013, now Pat. No. 8,660,866.

(60) Provisional application No. 61/657,522, filed on Jun. 8, 2012.

(51) Int. Cl.
*G06Q 40/00* (2012.01)
*G06Q 40/08* (2012.01)
*G06Q 40/06* (2012.01)

(52) U.S. Cl.
CPC ............ *G06Q 40/08* (2013.01); *G06Q 40/06* (2013.01)

(58) Field of Classification Search
CPC ........ G06Q 10/00; G06Q 20/00; G06Q 30/00; G06Q 40/00
USPC ....................................... 705/3–44
See application file for complete search history.

(56) References Cited

U.S. PATENT DOCUMENTS

| | | | | |
|---|---|---|---|---|
| 5,865,437 A * | 2/1999 | Moore, Jr. | .......... | A63F 3/00157 273/292 |
| 6,996,542 B1 * | 2/2006 | Landry | .................. | G06Q 20/04 705/34 |
| 7,533,045 B1 * | 5/2009 | Lange | .................... | G06Q 40/00 705/35 |

(Continued)

*Primary Examiner* — Frantzy Poinvil
(74) *Attorney, Agent, or Firm* — Greenberg Traurig, LLP

(57) ABSTRACT

In some embodiments, the instant invention is directed to a computer-implemented method that at least includes: programming a Process Administrator computer system to perform: receiving life insurance data for a plurality of life insurance policies; identifying a life insurance policy that has a catch-up deduction; classifying the insured lives of the life insurance policy into a plurality of insured classes of the insured lives; determining investment amount in a separate account; receiving investment data resulted from investing in an investment option; calculating an investment return amount attributed to the life insurance policy; determining a net investment return amount to be credited to the life insurance policy based on: an insured class, the investment return amount, and the catch-up deduction; and transmitting the net investment return amount so as to result in crediting the net investment return amount to the life insurance policy.

22 Claims, 15 Drawing Sheets

(56) References Cited

U.S. PATENT DOCUMENTS

| | | | | |
|---|---|---|---|---|
| 7,537,153 B2* | 5/2009 | Hurwitz | G06Q 10/087 235/379 |
| 7,640,202 B2* | 12/2009 | Foti | G06Q 40/00 705/36 R |
| 7,742,994 B1* | 6/2010 | Gupta | G06Q 20/367 705/64 |
| 8,001,025 B2* | 8/2011 | Vadhri | G06Q 20/02 705/35 |
| 8,005,739 B1* | 8/2011 | Reddy | G06Q 40/08 705/36 R |
| 8,165,902 B2* | 4/2012 | Chien | G06Q 40/08 705/4 |
| 8,271,307 B2* | 9/2012 | Butcher, III | G06Q 40/04 705/35 |
| 8,352,364 B2* | 1/2013 | Reardon | G06Q 20/10 705/35 |
| 2005/0075979 A1* | 4/2005 | Leavitt | G06Q 20/00 705/40 |
| 2006/0041453 A1* | 2/2006 | Clark | G06Q 40/00 705/4 |
| 2006/0065717 A1* | 3/2006 | Hurwitz | G06Q 10/087 235/381 |
| 2008/0040274 A1* | 2/2008 | Uzo | G06Q 20/40 705/44 |
| 2008/0215502 A1* | 9/2008 | Sabbia | G06Q 40/06 705/36 R |
| 2009/0164384 A1* | 6/2009 | Hellen | G06Q 40/06 705/36 R |
| 2011/0131069 A1* | 6/2011 | Koppes | G06Q 40/00 705/4 |
| 2012/0066006 A1* | 3/2012 | Paul | G06Q 40/08 705/4 |
| 2012/0226509 A1* | 9/2012 | Barron, Jr. | G06Q 40/00 705/4 |

* cited by examiner

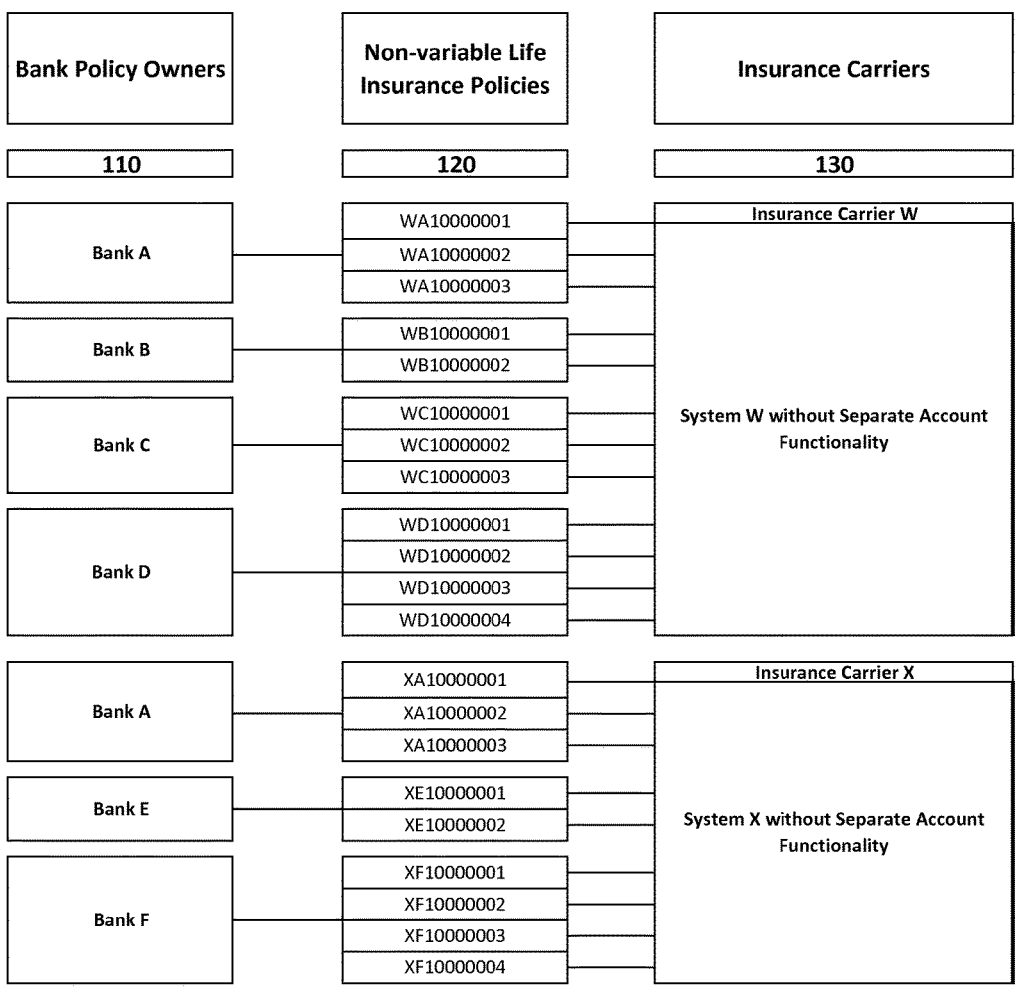

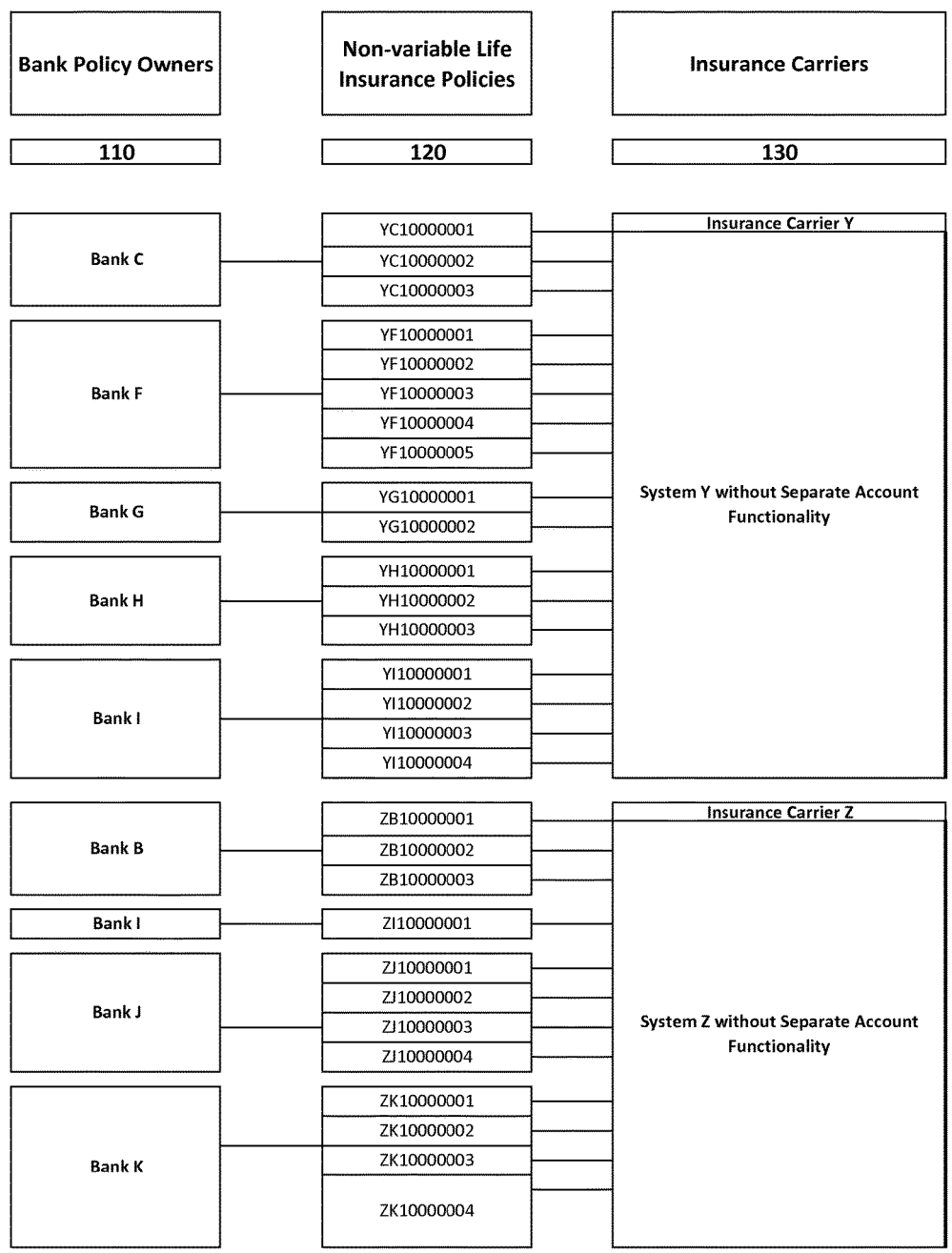

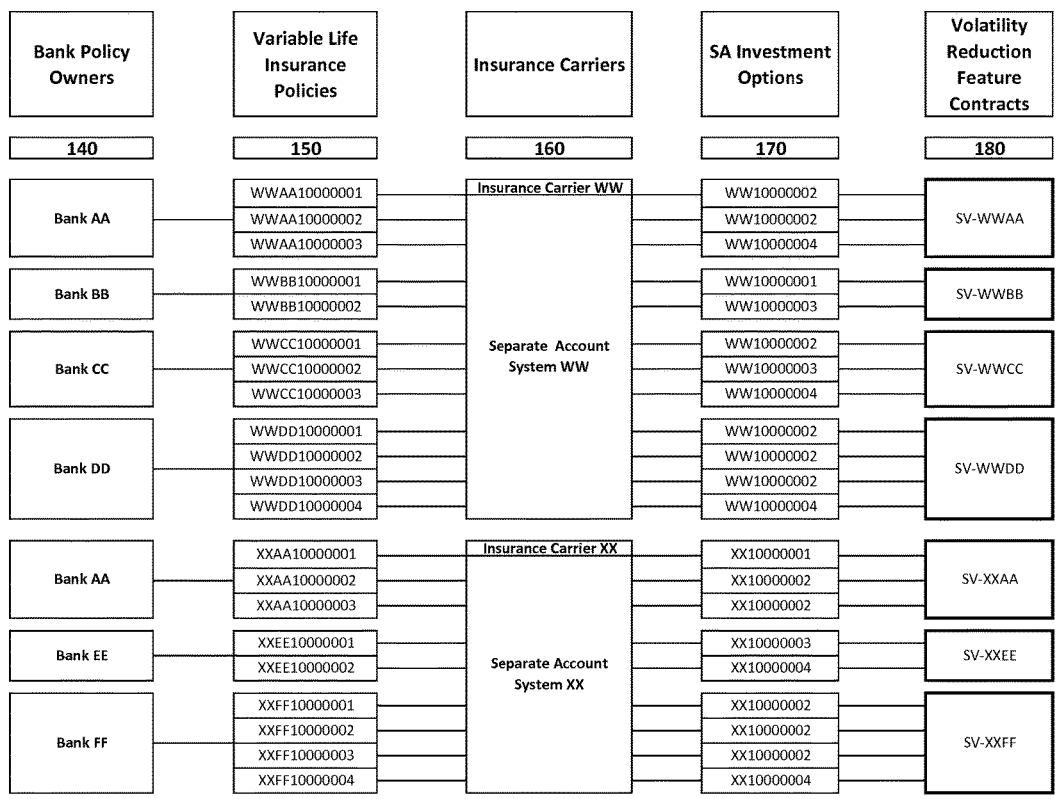

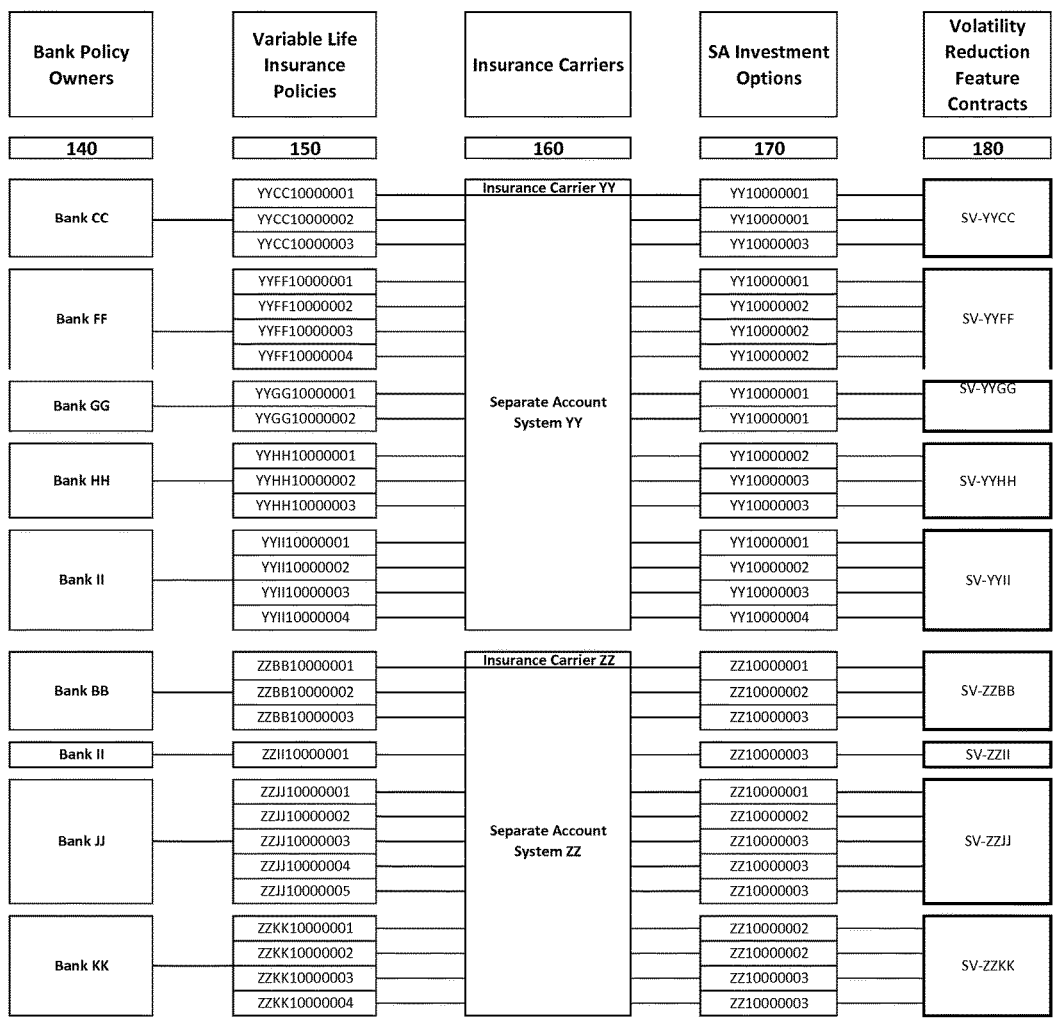

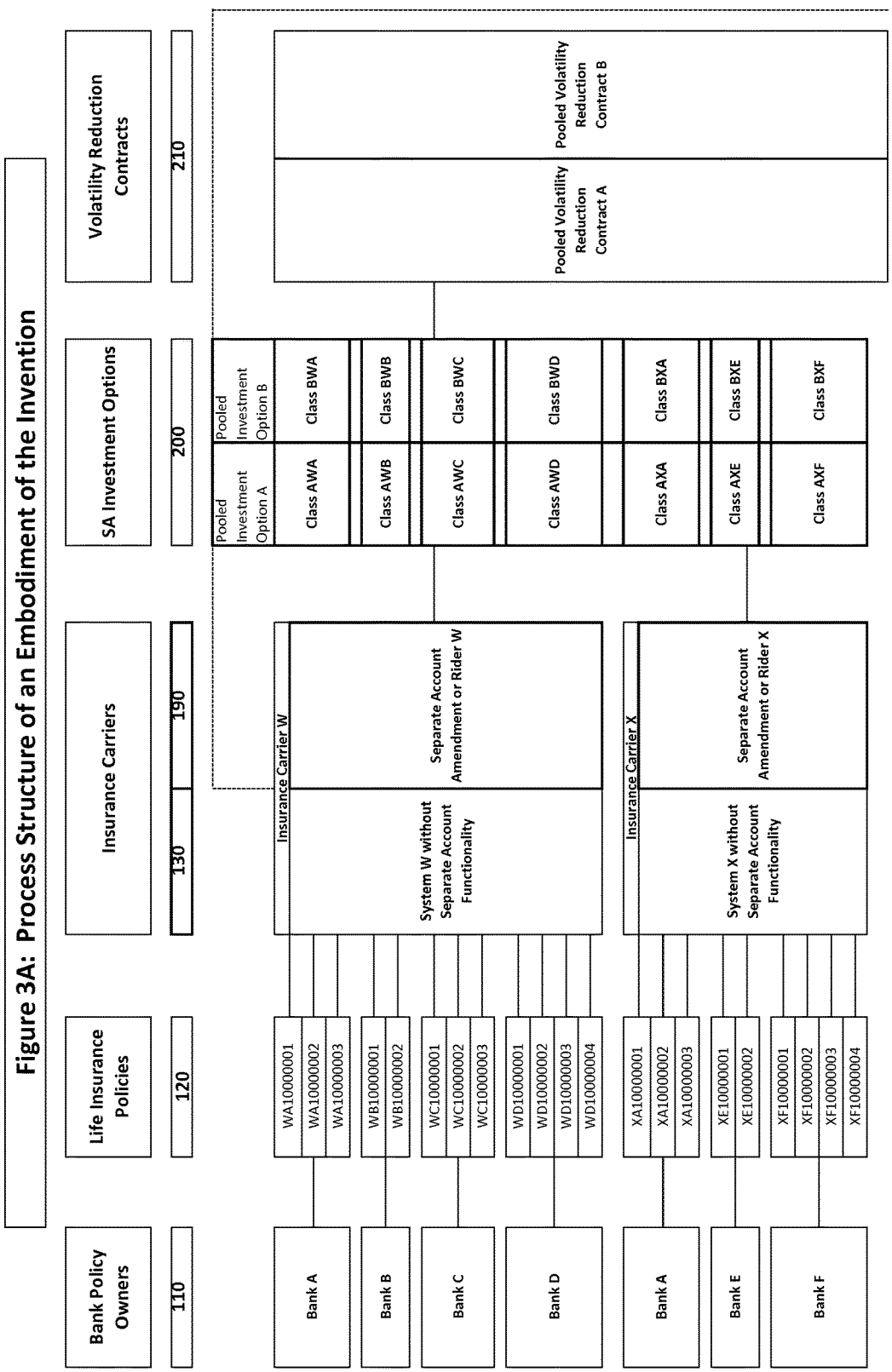
Figure 3A: Process Structure of an Embodiment of the Invention

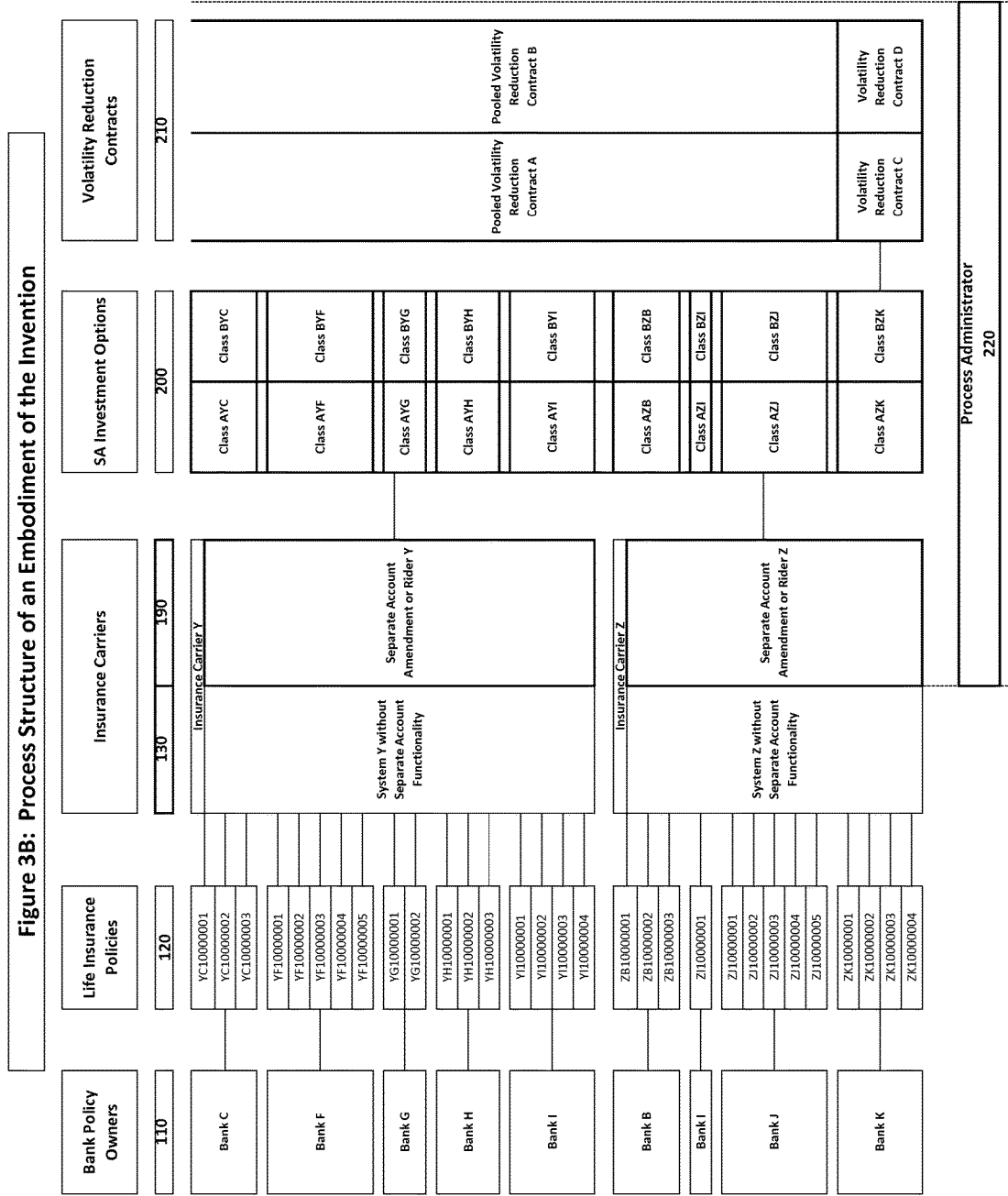
Figure 3B: Process Structure of an Embodiment of the Invention

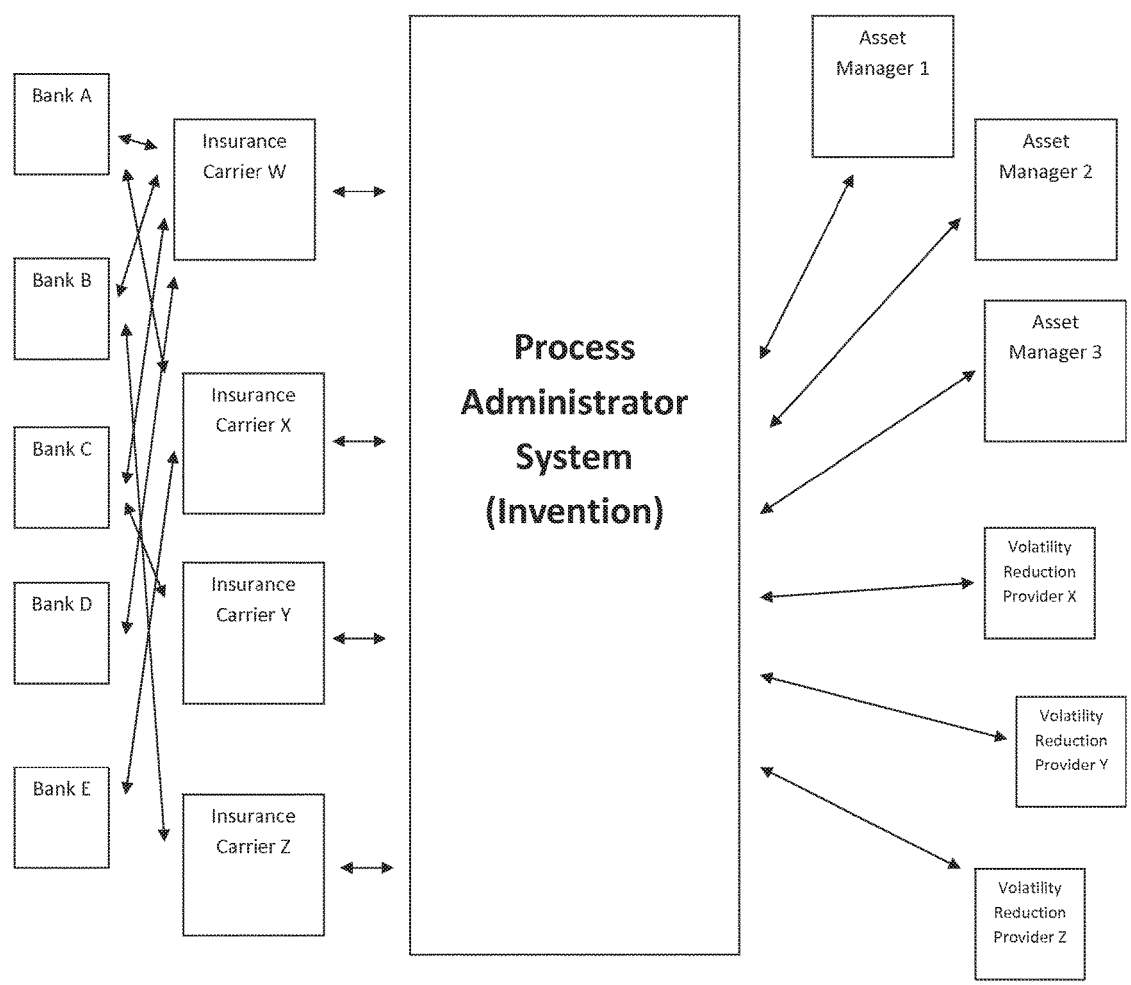
Figure 4: Overview of Some Embodiments of the Invention

Figure 5A Processing Details Related to Some Embodiments of the Invention

| 230 Insurance Carrier Without Separate Account Functionality | | 240 Process Administrator | | 250 Asset Manager |
|---|---|---|---|---|
| Insurance Carrier Processing | Communication to Process Administrator | Processing for Pooled Volatility Reduction Provider Processing | Processing for Asset Manager/LLC | Asset Manager System |
| 230.1a. Originally processed all policy owner transactions except allocations and transfers which aren't defined for a non-variable life insurance policy. Administration and accounting for allocations and transfers will need to be added. Provided accounting and update of cash value, payment of benefits to policy owners, and collection of funds from policy owners. Must start a variable life timing requirement for date transaction requests are received from policy owners and length of time to process. | 230.1b. The dollar amount of inflows & outflows from the cash value for policy owner transaction by policy (net premium, loan repayments, partial surrenders, surrenders, loans, death benefits) & separate account allocations and transfers need to be reported to the Process Administrator. | 240.1a. Process customer transaction for each investment option by policy. Calculates new cash values, carrier system units, cash value per carrier unit values, investment option market value units, investment option stable value units, as necessary. Totals all transactions for inflows and outflows by investment option. Provides accounting for investment option processing and sends to all parties. Sends trade & wire instructions to the Asset Managers. Sends customer transaction information to the Pooled Volatility Reduction Provider. | | |
| | | 240.1b. The market value and stable value from all policies in a pooled stable value wrap in an investment option are pooled. Stores all customer transaction information impacting the separate account. Make payment directions for surrenders, partial surrenders and loans if necessary. | | |
| | | | 240.1c. Tracks and stores shares and transactions by policy. Tracks and stores investment options market value units for each class. | 250.1. Invests all funds received in accordance with the investment policy. Funds from all customers (carriers) in the investment strategy are pooled. Tracks total shares in the pool, and calculates a daily share price. Is responsible for securities trading, custody, pricing and audits. Disperses funds for liquidations. |

Figure 5B Processing Details Related to Some Embodiments of the Invention

| 230 Insurance Carrier Without Separate Account Functionality || 240 Process Administrator || 250 Asset Manager |
|---|---|---|---|---|
| Insurance Carrier Processing | Communication to Process Administrator | Processing for Pooled Volatility Reduction Provider Processing | Processing for Asset Manager/LLC | Asset Manager System |
| 230.2a. For some products, the system processes cost of insurance deductions, per policy deductions, per $1000 of face amount deductions, per cent of premium deductions, percent of cash value deductions and other deductions, if applicable for policies where such deductions are defined, from cash value and updates accounting. | 230.2b. All deductions, if applicable, on a policy by policy basis need to be reported to the Process Administrator. | 240.2a. Processes deductions allocating them to appropriate investment options on a policy by policy basis as directed by the insurance carrier. Calculates investment option units, investment option market value units, investment option stable value units, as necessary. Totals all deductions by investment option. Provides accounting for portion of fees from each investment option and communicates to all parties. Sends trade and wire instructions to Asset Managers. | 240.2b. Stores policy deductions by applicable investment options of the separate account. | |
| | | | 240.2c. Tracks and stores shares and deductions by policy. Tracks and stores investment option market value units for each class. | 250.2. Processes trades and disperses funds for liquidations. |

Figure 5C Processing Details Related to Some Embodiments of the Invention

| 230 Insurance Carrier Without Separate Account Functionality | | 240 Process Administrator | | 250 Asset Manager |
|---|---|---|---|---|
| Insurance Carrier Processing | Communication to Process Administrator | Processing for Pooled Volatility Reduction Provider Processing | Processing for Asset Manager/LLC | Asset Manager System |
| 230.3a. For some products, an interest crediting rate is set and is used to increment the cash value. The interest crediting rate is generally the return on investments in the general account, less an interest spread for profit and recovery of certain insurance carrier expenses. | 230.3b. Provide the interest crediting rate to the Process Administrator. Provides Additional Deductions which would generally be the interest spread for profit and recovery of certain insurance carrier expenses, fees and expenses associated with the investments in the separate account, and pooled volatility reduction feature fees. | 240.3a. Calculates net separate account investment option interest rates by deducting Additional Deductions from the returns of the separate account investment options which will reflect the return for the class. Calculates a revised policy interest crediting rate as a linear combination of the interest crediting rate and the net separate account investment option interest rates and provides to insurance carrier. Deducts Additional Deductions from separate account investment options and recalculates cash values, investment options market value units and investment option stable value units, as necessary, which reflect returns for the class. Totals Additional Deductions by investment option. Provides accounting for portion of Additional Deductions for each investment option and provides to all parties. Send trade and wire instructions to Asset Managers. | | |
| | | 240.3b. Stores Additional Deductions by applicable investment options of the separate account. | 240.3c. Tracks and stores shares and Additional Deductions by policy. Tracks and stores investment option market value units for each class. Sends net fees and expenses associated with investments in the separate account to asset managers. Processes Additional Deduction revenue sharing from Asset Managers back to the insurance carrier. Processes revenue sharing portion of fees and expenses associated with investments in the separate account, if applicable. | 250.3. Disperses funds for liquidations. Receives net asset management and expense fee. Receives accounting for revenue sharing. |

Figure 5D Processing Details Related to Some Embodiments of the Invention

| 230 Insurance Carrier Without Separate Account Functionality | | 240 Process Administrator | | 250 Asset Manager |
|---|---|---|---|---|
| Insurance Carrier Processing | Communication to Process Administrator | Processing | Processing for Pooled Volatility Reduction Provider | Processing for Asset Manager/LLC | Asset Manager System |
| 230.4a. For some products, the cash value is scheduled and reflected as a number of carrier system units times the cash value per carrier unit, and possibly, credited with additional amounts through dividends and refunds. Inherent in this process are assumptions for Additional Deductions for the insurance carrier to recover the cost of benefits, expenses, and profit. | 230.4b. Provide the carrier system units and cash value per carrier unit to the Process Administrator. Provides Additional Deductions which may include cost of insurance, expenses, cash value interest spreads and other deductions necessary to administer a life insurance policy, and additional fees and expenses associated with investments in the separate account and the pooled volatility reduction feature fees, if applicable. | 240.4a. Deducts Additional Deductions from separate account investment options and recalculates cash values, investment options market value units and investment options stable value units, as necessary, which reflect returns for the class. Calculates revised carrier system units and/or revised cash value per carrier unit so that the product would result in the total cash value after Additional Deductions and provides to insurance carrier. Totals Additional Deductions by investment option. Provides accounting for portion of Additional Deductions for each investment option and provides to all parties. Send trade and wire instructions to Asset Managers. | 240.4b. Stores Additional Deductions by applicable investment options of the separate account. | 240.4c. Tracks and stores shares and Additional Deductions by policy. Tracks and stores investment option market value units for each class. Sends net fees and expenses associated with investments in the separate account to asset managers. Processes Additional Deduction revenue sharing from Asset Managers back to the insurance carrier. Processes revenue sharing portion of fees and expenses associated with investments in the separate account, if applicable. | 250.4. Disperses funds for liquidations. Receives net asset management and expense fee. Receives accounting for revenue sharing. |

Figure 5E Processing Details Related to Some Embodiments of the Invention

| 230 Insurance Carrier Without Separate Account Functionality | | 240 Process Administrator | | 250 Asset Manager |
|---|---|---|---|---|
| Insurance Carrier Processing | Communication to Process Administrator | Processing | Processing for Pooled Volatility Reduction Provider | Processing for Asset Manager/LLC | Asset Manager System |
| 230.5a. System updates cash values and revised interest crediting rates on a periodic basis. Many systems will have one interest rate that is used for all policies of the product. System will need to be updated to use a unique revised interest crediting rate for each policy. | | 240.5a. Calculates end-of-day cash value and units for each investment option and provide to carrier. Calculate end-of-day investment option market value units, end-of-day investment option stable value units and provides to carrier and Pooled Volatility Reduction Provider.<br><br>240.6a. Provide reporting to policy owners of separate account values, market value and stable value for each investment option, listings of assets, and returns information. | 240.5b. Tracks and stores total wrapped market value and stable value amounts from wrapped policies. Periodically calculates gross stable value interest rates for applicable investment options. Collection/payment of pooled volatility reduction feature fees. Calculates and pays pooled volatility reduction feature revenue sharing, if applicable. | | |

Figure 5F Processing Details Related to Some Embodiments of the Invention

| 230 | | 240 | | 250 |
|---|---|---|---|---|
| Insurance Carrier Without Separate Account Functionality | | Process Administrator | | Asset Manager |
| Insurance Carrier Processing | Communication to Process Administrator | Processing | Processing for Pooled Volatility Reduction Provider | Processing for Asset Manager/LLC | Asset Manager System |
| | | 240.7a. Diligence sub-accounts. | 240.7b. Process any adjustments for impaired securities. | 240.7c. Diligence sub-accounts for compliance with investment objectives and tax compliance (817h) | |

METHOD AND SYSTEM FOR ADMINISTERING LIFE INSURANCE PRODUCTS THROUGH CLASSIFYING INSURED LIVES TO ALLOCATE COSTS

RELATED APPLICATIONS

This instant application is a continuation of U.S. patent application Ser. No. 14/185,618, filed Feb. 20, 2014 now abandoned, which is a continuation of U.S. patent application Ser. No. 13/797,386, filed Mar. 12, 2013, now U.S. Pat. No. 8,660,866 which claims the benefit of the earlier filing date of U.S. Provisional Patent Application No. 61/657,522, entitled "METHOD AND SYSTEM FOR ADMINISTERING LIFE INSURANCE PRODUCTS THAT, AFTER ISSUANCE, ADD A FEATURE REQUIRING ADMINISTRATION THROUGH SEPARATE ACCOUNT AND POOLED INVESTMENT OPTION FUNCTIONALITY," filed on Jun. 8, 2012, which is incorporated herein by reference in its entirety for all purposes.

TECHNICAL FIELD

In an embodiment, the present invention relates to financial products and, more particularly, methods and systems for administering life insurance products.

BACKGROUND

For purposes of this disclosure, in some embodiments, the term "Life insurance product(s)" refers to annuities and other life insurance products such as, but not limited to, variable universal life, variable life, universal life, and traditional (non-variable) whole and universal life products along with any riders.

For example, Bank-owned life insurance (BOLI) and corporate-owned life insurance (COLI) products have been used by banks and corporations to fund employee benefits because of the substantial cost advantages of these products. Some BOLI and COLI products can be non-variable life insurance policies which have cash values invested in the insurance carrier's general account resulting in the policy owner's ability to account for their insurance by booking the cash surrender value but being exposed to the credit risk of the insurance carrier. FIGS. 1A and 1B depict a scenario where Banks A through K purchased non-variable life insurance policies from Insurance Carriers W through Z. The insurance policy would be administered on the insurance carrier's system, and all cash value was invested in the insurance carrier's general account. Policy owners would split large purchases between several insurance carriers in order to limit the credit risk exposure to each. FIGS. 1A and 1B depict such a split where Bank A purchased policies from Insurance Carrier W and Insurance Carrier X.

Other BOLI and COLI products can be variable life insurance policies which have cash values invested in various investment options of an insurance carrier's segregated, separate account which is protected from the claims of creditors of the insurance carrier. Still other BOLI and COLI products could have volatility reduction features to investment options in the separate account.

SUMMARY OF INVENTION

In some embodiments, the instant invention is directed to a computer-implemented method that at least includes: programming a Process Administrator computer system to perform at least: receiving life insurance data for a plurality of life insurance policies associated with: (i) at least two policy owners, and (ii) at least 3000 insured lives and/or at least $500 million of assets; identifying, from the plurality of life insurance policies, at least one first life insurance policy that has at least one first catch-up deduction where the at least one first catch-up deduction equals at least one first insurance cost that exceeds at least one first maximum allowed insurance deduction that is deductible under the at least one first life insurance policy; classifying the insured lives of the at least one first life insurance policy into a plurality of insured classes of the insured lives; determining, based on variable life insurance data of the life insurance data, at least one first investment amount in at least one first separate account associated with the plurality of life insurance policies identified in the variable life insurance data; receiving investment data resulted from investing, in at least one first investment option, at least a portion of the at least one first investment amount; calculating at least one first investment return amount attributed to the at least one first life insurance policy based, at least in part, on: i) the investment data, and ii) a portion of the at least one first investment amount of the at least one first separate account that is attributed to the at least one first life insurance policy; determining at least one first net investment return amount to be credited to the at least one first life insurance policy based, at least in part, on: i) at least one first insured class from plurality of insured classes of the insured lives, ii) the at least one first investment return amount, and iii) the at least one first catch-up deduction; and transmitting the at least one first net investment return amount so as to result in crediting the at least one first net investment return amount to the at least one first life insurance policy.

In some embodiments, the Process Administrator computer system is programmed to further perform at least: allocating, to the at least one first life insurance policy, at least a portion of at least one first investment cost resulting from the investing so as to determine at least one first net investment return amount based, at least in part, on: i) the at least one first insured class of at least one first insured life, and ii) the investment data, and iii) a first allocation condition that a first sum of the at least one first catch-up deduction and the allocated portion of the at least one first investment cost is greater than the at least one first maximum allowed insurance deduction that is deductible under the at least one first life insurance policy; and wherein the determining, the at least one first net investment return amount to be credited to the at least one first life insurance policy further based, at least in part, on: iv) the first sum of the at least one first catch-up deduction and the allocated portion of the at least one first investment cost.

In some embodiments, the determining the at least one first investment amount further includes deducting, for the at least one first life insurance policy, at least one of: i) the at least one first insurance deduction and ii) at least one transaction amount.

In some embodiments, the determining the at least one first net investment return amount to be credited to the at least one first life insurance policy further includes: transmitting at least one first sell instruction to satisfy the at least one first catch-up deduction, and transmitting at least one first instruction to utilize an amount of the at least one first catch-up deduction to be deducted from the at least one first investment return amount for at least one first revenue share payment to a life insurance carrier associated with the at least one first life insurance policy.

In some embodiments, the at least one investment option comprises an actively managed investment strategy. In some embodiments, the actively managed investment strategy comprises at least one pooled volatility reduction feature. In some embodiments, the determining the at least one first net investment return amount to be credited to the at least one first life insurance policy is performed within 3 business days after the investment data is received.

In some embodiments, the determining the at least one first net investment return amount to be credited to the at least one first life insurance policy is performed within 3 business days after the investment data is received. In some embodiments, the steps are performed on a pre-determined periodic time basis. In some embodiments, the steps are performed on each time the life insurance data is received. In some embodiments, the life insurance data comprises at least one of the following: (a) allocations, (b) net premium deposits, (c) loan repayments, (d) partial surrenders, (e) surrenders, (f) loans, (g) death benefits, (h) transfers between investment alternatives, (i) insurance deductions, and (j) catch-up deductions. In some embodiments, the at least one first catch-up deduction is one of the following: (a) cost of insurance deduction, (b) policy fee deduction, (c) per thousand of face amount deduction, (d) percent of cash value deduction, (e) other deduction, and (f) rider deduction.

In some embodiments, the at least one first catch-up deduction is derived from a plurality of catch-up deductions that are banded or modified based on at least one second policy characteristic associated with the plurality of life insurance policies. In some embodiments, the determining the at least one first net investment return amount to be credited to the at least one first life insurance policy further comprises at least one of: changing at least one first interest crediting rate applied to a cash value of the at least one first life insurance policy; changing at least one first carrier system unit value or a number of units established by a life insurance carrier for the at least one first life insurance policy; and changing at least one first carrier system cash value of the at least one first particular life insurance policy.

In some embodiments, the instant invention is directed to another computer-implemented method that at least includes: programming a Process Administrator computer system to perform at least: receiving life insurance data for a plurality of life insurance policies associated with: (i) at least two life insurance carriers, and (ii) at least 3000 insured lives and/or at least $500 million of assets; identifying, from the plurality of life insurance policies, at least one first life insurance policy that has at least one first catch-up deduction where the at least one first catch-up deduction equals at least one first insurance cost that exceeds at least one first maximum allowed insurance deduction that is deductible under the at least one first life insurance policy; classifying the insured lives of the at least one first life insurance policy into a plurality of insured classes of the insured lives; determining, based on variable life insurance data of the life insurance data, at least one first investment amount in at least one first separate account associated with the plurality of life insurance policies identified in the variable life insurance data; receiving investment data resulted from investing, in at least one first investment option, at least a portion of the at least one first investment amount; calculating at least one first investment return amount attributed to the at least one first life insurance policy based, at least in part, on: i) the investment data, and ii) a portion of the at least one first investment amount of the at least one first separate account that is attributed to the at least one first life insurance policy; determining at least one first net investment return amount to be credited to the at least one first life insurance policy based, at least in part, on: i) at least one first insured class from plurality of insured classes of the insured lives, ii) the at least one first investment return amount, and iii) the at least one first catch-up deduction; and transmitting the at least one first net investment return amount so as to result in crediting the at least one first net investment return amount to the at least one first life insurance policy.

In some embodiments, the instant invention is directed to a computerized system for monitoring investment trading of shares of at least one mutual fund that at least includes: at least one computer having a non-transient computer tangible readable medium having stored thereon software instructions executable by at least one processor of the computer that at least include: code to program a Process Administrator computer system to perform at least: receiving life insurance data for a plurality of life insurance policies associated with: (i) at least two policy owners, and (ii) at least 3000 insured lives and/or at least $500 million of assets; identifying, from the plurality of life insurance policies, at least one first life insurance policy that has at least one first catch-up deduction where the at least one first catch-up deduction equals at least one first insurance cost that exceeds at least one first maximum allowed insurance deduction that is deductible under the at least one first life insurance policy; classifying the insured lives of the at least one first life insurance policy into a plurality of insured classes of the insured lives; determining, based on variable life insurance data of the life insurance data, at least one first investment amount in at least one first separate account associated with the plurality of life insurance policies identified in the variable life insurance data; receiving investment data resulted from investing, in at least one first investment option, at least a portion of the at least one first investment amount; calculating at least one first investment return amount attributed to the at least one first life insurance policy based, at least in part, on: i) the investment data, and ii) a portion of the at least one first investment amount of the at least one first separate account that is attributed to the at least one first life insurance policy; determining at least one first net investment return amount to be credited to the at least one first life insurance policy based, at least in part, on: i) at least one first insured class from plurality of insured classes of the insured lives, ii) the at least one first investment return amount, and iii) the at least one first catch-up deduction; and transmitting the at least one first net investment return amount so as to result in crediting the at least one first net investment return amount to the at least one first life insurance policy.

In some embodiments, the instant invention is directed to another computerized system for monitoring investment trading of shares of at least one mutual fund that at least includes: at least one computer having a non-transient computer tangible readable medium having stored thereon software instructions executable by at least one processor of the computer that at least include: code to program a Process Administrator computer system to perform at least: receiving life insurance data for a plurality of life insurance policies associated with: (i) at least two life insurance carriers, and (ii) at least 3000 insured lives and/or at least $500 million of assets; identifying, from the plurality of life insurance policies, at least one first life insurance policy that has at least one first catch-up deduction where the at least one first catch-up deduction equals at least one first insurance cost that exceeds at least one first maximum allowed insurance deduction that is deductible under the at least one first life insurance policy; classifying the insured lives of the at least one first life insurance policy into a plurality of insured classes of the insured lives; determining, based on variable life insurance data of the life insurance data, at least one first investment amount in at least one first separate account associated with the plurality of life insurance policies identified in the variable life insurance data; receiving investment data resulted from investing, in at least one first investment option, at least a portion of the at least one first investment amount; calculating at least one first investment return amount attributed to the at least one first life insurance policy based, at least in part, on: i) the investment data, and ii) a portion of the at least one first investment amount of the at least one first separate account that is attributed to the at least one first life insurance policy; determining at least one first net investment return amount to be credited to the at least one first life insurance policy based, at least in part, on: i) at least one first insured class from plurality of insured classes of the insured lives, ii) the at least one first investment return amount, and iii) the at least one first catch-up deduction; and transmitting the at least one first net investment return amount so as to result in crediting the at least one first net investment return amount to the at least one first life insurance policy.

BRIEF DESCRIPTION OF THE DRAWINGS

The present invention will be further explained with reference to the attached figures. The figures constitute a part of this specification and include illustrative embodiments of the present invention and illustrate various objects and features thereof. Specific functional details disclosed herein are not to be interpreted as limiting, but merely as a representative basis for teaching one skilled in the art to variously employ the present invention.

FIGS. 1A and 1B illustrate some typical non-variable life insurance structure.

FIGS. 2A and 2B illustrate some typical variable life insurance with volatility reduction feature structure.

FIGS. 3A and 3B illustrate some aspect of process/administration structure of some embodiment of the instant invention.

FIG. 4 illustrate some aspects of some other embodiments of the invention.

FIGS. 5A-5F illustrate processing/administering details related to yet some other embodiments of the invention.

Figure 6:
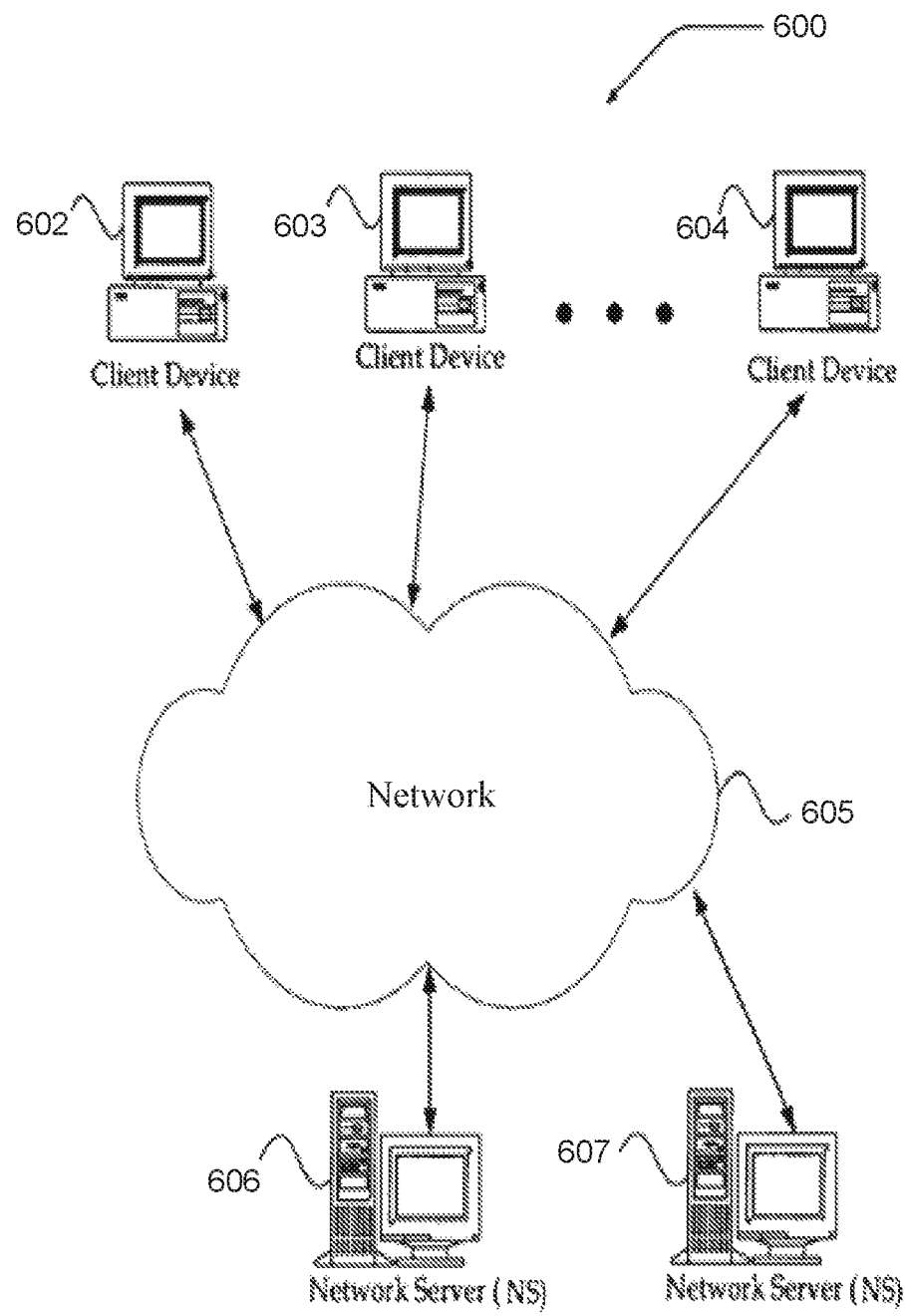
FIG. 6 illustrates a computer system according to some embodiments of the invention.

The figures constitute a part of this specification and include illustrative embodiments of the present invention and illustrate various objects and features thereof. Further, the figures are not necessarily to scale, some features may be exaggerated to show details of particular components. In addition, any measurements, specifications and the like shown in the figures are intended to be illustrative, and not restrictive. Therefore, specific structural and functional details disclosed herein are not to be interpreted as limiting, but merely as a representative basis for teaching one skilled in the art to variously employ the present invention.

DETAILED DESCRIPTION

Throughout the specification and claims, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

Throughout the patent, insurance deduction(s) describe(s) a monetary (e.g., dollar) amount that is subtracted from the cash value on a periodic basis as specified in the insurance policy contract for a life insurance product. Throughout the patent, insurance cost(s) refer(s) to an expense incurred or profit margin required by the life insurance carrier for providing the benefit(s) in a life insurance product.

In some embodiments, the invention relates to methods and systems for administering life insurance products by allocating insurance costs incurred during the life insurance product's existence (e.g., insurance and/or investment costs, etc.) when those incurred insurance costs exceed maximum allowed insurance deduction(s) that are set in contracts of the life insurance products. In some embodiments, the invention relates to methods and systems for administering life insurance products that further include separate account investment options as variable component(s).

FIGS. 1A and 1B illustrate a structure of a typical non-variable life insurance product. FIGS. 1A and 1B depict blocks of non-variable life insurance policies bought by banks and issued by various insurance carriers. Typically, most of those non-variable life insurance policies were issued beginning in the 1980's and have accumulated substantial investment gains. Most of those non-variable life insurance policies were issued as single premium paid-up life insurance using whole life or universal life insurance contracts. Typically, banks own the policies, insure a class of employees in which they had an insurable interest, and collect the death benefits. Typically, banks would hold those policies until employee's death because surrendering a policy prior to death created a loss on the bank's financial statements, and replacing a policy was costly and in most circumstances could only be done for insureds who were still employees due to state insurable interest requirements. Over time, many insurance carriers typically have been acquired or have exited the BOLI market and put their blocks of BOLI in run-off which is an issue for policy owners. Typically, banks have been unable to replace their existing non-variable life insurance policy with a variable life insurance policy because most insureds are no longer employed. Updating existing non-variable life insurance policies by adding separate account functionality could result in incurring insurance costs (e.g., insurance benefit costs, investment fees, transaction fees, etc.) that are not defined or above the insurance deductions set in the insurance policy contracts of those life insurance policies, and further modification to the insurance policy contracts for those insurance deductions results in an unacceptable change in insurance status with higher long-term costs to the policy owner.

FIGS. 2A and 2B illustrate a typical variable life insurance product with volatility reduction feature structure. In some cases, volatility reduction features were initially designed so the contract only covered a bank's policies issued by a single insurance carrier (see 180). In some cases, the majority of large bank purchases of BOLI since the mid-1990 have been purchases of variable life insurance with volatility reduction features. In some cases, variable life insurance provides banks policy owners with an array of investment options tailored to banks which are segregated in separate accounts and protected from the claims of creditors of the insurance carrier (see 170). In some cases, this eliminates the credit exposure to the insurance carrier of the bank policy owner's cash value. In some cases, variable life insurance provides other benefits not found in non-variable life insurance which make it a preferred product for bank purchases.

For instance, FIGS. 2A and 2B depict another version of the market where Banks AA through KK purchased variable life insurance policies from Insurance Carriers WW through ZZ. In some cases, cash value was invested in various investment options of the insurance carrier's separate account, and there was a volatility reduction feature for each bank. In some cases, the insurance policy would be administered on the insurance carrier's separate account system. In some cases, these systems could typically administer all policy owner transactions including allocating policy owner cash value to multiple investment options as well as supporting the transfer between investment options. In some cases, they typically would have functionality to deduct all forms of insurance deductions found in life insurance policies including unique percentage of cash value policy loads from each investment option.

In some embodiments, as detailed herein, the instant invention is applicable to variable life insurance products associated with at least one separate account.

In some embodiments, as detailed herein, the instant invention is applicable to non-variable life insurance products that have been amended by further including an amendment or life insurance rider that allows for investment in a separate account. In some embodiments, the amendment or life insurance rider contains variable life disclosures as required by requirements of the state of issue of the policy, federal government, and/or industry regulatory agency(ies). In some embodiment, there can be two or more types/forms of the amendment or life insurance rider (e.g., at least one version for Whole Life Insurance Policies and/or at least one version for Universal Life Insurance Policies). Below are non-limiting examples of the riders for a Universal Life Insurance Policy and a Whole Life Insurance Policy.

An Example of a Separate Account Investment Option Rider for a Universal Life Insurance Policy If [Insurance Company] has approved this rider as a part of this policy, the rider will become a part of the policy. This rider adds sub-account investment options. You may allocate any amount of the cash value of this policy to be invested in any sub account described on page [XXX] of the [Policy Specifications Pages] subject to any limitations imposed by the asset manager as noted. The amount or duration of death benefit may be variable or fixed under specified conditions. Cash values allocated to a sub-account may increase or decrease in accordance with the experience of the separate account. The [guaranteed interest crediting rate] is not applicable to amounts allocated to a sub-account, because amounts so allocated will vary to reflect the full return of the investment experience of the sub-account. The rider is subject to all applicable terms and provisions of the policy.

Policy Specifications Pages Page [XXX]

The investment options added by the Separate Account Investment Option Rider [UL] are provided through investments in sub-accounts of [Separate Account YYY]. [Insurance Company] reserves the right to make additional separate accounts or sub-accounts available, to delete separate accounts or sub-accounts, combine separate accounts or sub-accounts, transfer assets between separate accounts or sub-accounts, and to make additions to, deletions from or substitutions for the assets that are held by sub-accounts or that sub-accounts may purchase. Prior notification will be made to owners. The assets of [Separate Account YYY] shall be available to cover the liabilities of the general account of [Insurance Company] only to the extent that the assets of the separate account exceed the liabilities of the separate account arising under the variable life insurance policies supported by the separate account. The assets of [Separate Account YYY] shall be valued at least as often as any policy benefits vary but at least monthly.

Allocations to sub-accounts or transfers among sub-accounts must be received by [Insurance Company] in writing by 4:00 P.M. Eastern Standard Time on a day the New York Stock Exchange is open for business in order to be processed on that day. Allocations to and transfers between sub-accounts are subject to any limitations imposed by the asset manager, and amounts allocated to sub-accounts may not be transferred out of the separate account without permission of [Insurance Company]. Payment of benefits, cash values, policy loans or partial withdrawals (except when used to pay premiums) or partial surrenders may be deferred for any period during which the New York Stock Exchange is closed for trading (except for normal holiday closing) or when the Securities and Exchange Commission has determined that a state of emergency exists which may make such payment impractical. Such payments are also subject to any limitations imposed by the asset manager.

Sub-Account Investment Options in Shares of ["AFA"]

Following is a brief description of AFA sub-accounts. The private placement memorandum contains a complete description. Asset Management Company, "AMC", provides investment management services to [AFA] for the following Sub-Accounts.

1. AFA Class [ZZZ] AMC Core Fixed Income Securities Sub-Account seeks high current income consistent with relative stability of principal. The sub-account seeks to outperform the Barclay's Aggregate Bond Index over a full market cycle using a risk managed approach and invests in a diversified portfolio of investment grade fixed income securities including primarily corporate bonds, government bonds, asset backed and mortgage-backed securities.

2. AFA Class [ZZZ] AMC Mortgage-Backed Securities Sub-Account seeks current income consistent with relative stability of principal. The sub-account seeks to outperform the Barclay's U.S. Securitized Benchmark over a full market cycle using a risk managed approach and invests in a diversified portfolio.

Pooled Volatility Reduction Sub-Accounts:

Each Pooled Volatility Reduction Sub-Account invests in a sub-account described previously and a pooled wrap agreement. The pooled wrap agreement has restrictions to remain in force. All transactions including premium payments, loan repayments, transfers, loans, partial surrenders and surrenders and death benefit payouts involving a pooled volatility reduction sub-account may adversely impact the cash value in accordance to the terms in the pooled wrap agreement. The cash value will be the value of the amounts of the remaining securities in the sub-account if the pooled wrap agreement is terminated.

3. Pooled Volatility Reduction AFA Class [ZZZ] AMC Core Fixed Income Securities Sub-Account seeks to provide the average return without market fluctuations of the underlying sub-account less AFA and pooled wrap agreement expenses. The sub-account invests in the AFA Class [ZZZ] AMC Core Fixed Income Securities Sub-Account and a pooled wrap agreement. The Pooled Volatility Reduction AFA Class [ZZZ] AMC Core Fixed Income Securities Sub-Account may change the underlying sub-account or investment allocation per the terms of the pooled wrap agreement. Other restrictions apply as described in the private placement memorandum.

4. Pooled Volatility Reduction AFA Class [ZZZ] AMC Mortgage-Backed Securities Sub-Account seeks to provide the average return without market fluctuations of the underlying sub-account less AFA and pooled wrap agreement expenses. The sub-account invests in the AFA Class [ZZZ] AMC Mortgage-Backed Securities Sub-Account and a pooled wrap agreement. The Pooled Volatility Reduction AFA Class [ZZZ] AMC Mortgage-Backed Securities Sub-Account may change the underlying sub-account or investment allocation per the terms of the pooled wrap agreement. Other restrictions apply as described in the private placement memorandum.

An Example of a Separate Account Investment Option Rider for a Whole Life Insurance Policy If [Insurance Company] has approved this rider as a part of this policy, the rider will become a part of the policy. This rider adds sub-account investment options. You may allocate any amount of the cash value of this policy or the cash value of paid-up additions to be invested in any sub account described on page [XXX] of the [Policy Specifications Pages] subject to any limitations imposed by the asset manager as noted. The amount or duration of death benefit may be variable or fixed under specified conditions. Cash values allocated to a sub-account may increase or decrease in accordance with the experience of the separate account. The [Guaranteed Values Table] is not applicable to that portion of the policy cash value allocated to a sub-account because cash value allocated to the sub-accounts will vary to reflect the full return of the investment experience of the sub-account. The death benefit associated with cash value of the policy or cash value of paid-up additions allocated to the sub-accounts will equal amounts purchased by the cash value in the sub-account based on the [Paid-Up Addition Table Cash Value Rates]. The rider is subject to all applicable terms and provisions of the policy.

Policy Specifications Pages Page [XXX]

The investment options added by the Separate Account Investment Option Rider [UL] are provided through investments in sub-accounts of [Separate Account YYY]. [Insurance Company] reserves the right to make additional separate accounts or sub-accounts available, to delete separate accounts or sub-accounts, combine separate accounts or sub-accounts, transfer assets between separate accounts or sub-accounts, and to make additions to, deletions from or substitutions for the assets that are held by sub-accounts or that sub-accounts may purchase. Prior notification will be made to owners.

The assets of [Separate Account YYY] shall be available to cover the liabilities of the general account of [Insurance Company] only to the extent that the assets of the separate account exceed the liabilities of the separate account arising under the variable life insurance policies supported by the separate account. The assets of [Separate Account YYY] shall be valued at least as often as any policy benefits vary but at least monthly.

Allocations to sub-accounts or transfers among sub-accounts must be received by [Insurance Company] in writing by 4:00 P.M. Eastern Standard Time on a day the New York Stock Exchange is open for business in order to be processed on that day. Allocations to and transfers between sub-accounts are subject to any limitations imposed by the asset manager, and amounts allocated to sub-accounts may not be transferred out of the separate account without permission of [Insurance Company]. Payment of benefits, cash values, policy loans or partial withdrawals (except when used to pay premiums) or partial surrenders may be deferred for any period during which the New York Stock Exchange is closed for trading (except for normal holiday closing) or when the Securities and Exchange Commission has determined that a state of emergency exists which may make such payment impractical. Such payments are also subject to any limitations imposed by the asset manager.

Sub-Account Investment Options in Shares of ["AFA"]

Following is a brief description of AFA sub-accounts. The private placement memorandum contains a complete description. Asset Management Company, "AMC", provides investment management services to [AFA] for the following Sub-Accounts.

1. AFA Class [ZZZ] AMC Core Fixed Income Securities Sub-Account seeks high current income consistent with relative stability of principal. The sub-account seeks to outperform the Barclay's Aggregate Bond Index over a full market cycle using a risk managed approach and invests in a diversified portfolio of investment grade fixed income securities including primarily corporate bonds, government bonds, asset backed and mortgage-backed securities.

2. AFA Class [ZZZ] AMC Mortgage-Backed Securities Sub-Account seeks current income consistent with relative stability of principal. The sub-account seeks to outperform the Barclay's U.S. Securitized Benchmark over a full market cycle using a risk managed approach and invests in a diversified portfolio.

Pooled Volatility Reduction Sub-Accounts:

Each Pooled Volatility Reduction Sub-Account invests in a sub-account described previously and a pooled wrap agreement. The pooled wrap agreement has restrictions to remain in force. All transactions including premium payments, loan repayments, transfers, loans, partial surrenders and surrenders and death benefit payouts involving a pooled volatility reduction sub-account may adversely impact the cash value in accordance to the terms in the pooled wrap agreement. The cash value will be the value of the amounts of the remaining securities in the sub-account if the pooled wrap agreement is terminated.

3. Pooled Volatility Reduction AFA Class [ZZZ] AMC Core Fixed Income Securities Sub-Account seeks to provide the average return without market fluctuations of the underlying sub-account less AFA and pooled wrap agreement expenses. The sub-account invests in the AFA Class [ZZZ] AMC Core Fixed Income Securities Sub-Account and a pooled wrap agreement. The Pooled Volatility Reduction AFA Class [ZZZ] AMC Core Fixed Income Securities Sub-Account may change the underlying sub-account or investment allocation per the terms of the pooled wrap agreement. Other restrictions apply as described in the private placement memorandum.

4. Pooled Volatility Reduction AFA Class [ZZZ] AMC Mortgage-Backed Securities Sub-Account seeks to provide the average return without market fluctuations of the underlying sub-account less AFA and pooled wrap agreement expenses. The sub-account invests in the AFA Class [ZZZ] AMC Mortgage-Backed Securities Sub-Account and a pooled wrap agreement. The Pooled Volatility Reduction AFA Class [ZZZ] AMC Mortgage-Backed Securities Sub-Account may change the underlying sub-account or investment allocation per the terms of the pooled wrap agreement. Other restrictions apply as described in the private placement memorandum.

In some embodiments, the instant invention is utilized for separate account assets invested in a hold-to-maturity investment strategy for the individual policy owner.

In some embodiments, the instant invention is utilized for separate account variable life insurance policies that employ actively managed (vs. hold-to-maturity) investment strategies where asset managers can buy and sell securities at their discretion and which generally achieve higher returns but can require more significant asset size (e.g., over $50 million) in order to achieve efficiencies of scale and incorporate active trading. In some embodiments, policy owners recognize volatile investment returns from actively managed strategies due to mark-to-market accounting and those returns can be smoothed out if volatility reduction features are incorporated.

For example, in addition to insurance carrier separate account systems, asset managers that managed the various investment options offered by an insurance carrier had systems that would track the value of the assets in an investment option. In some cases, asset managers could offer different classes of an investment option, where the difference in classes was due to different investment or distribution expenses deducted from the investment return of a portfolio of assets which were pooled for all investors in the particular investment strategy, different amounts of revenue sharing back to the insurance carrier, and different net investment returns.

In some embodiments, the instant invention provides a functionality of calculating, by specifically programmed management computer systems, various forms of insurance deductions found in life insurance policies and to then use them as expenses to form different insured classes of the insured lives with different net investment returns (the classification functionality) when insurance costs exceed maximum insurance deduction(s) set in the insurance policy contracts.

In some embodiments, the instant invention allows the policy owner to reduce cost that would have been associated with surrendering an older version of the product that has gains, and then additional costs with the purchase of a newer version. Specifically, the instant invention allows reducing cost that would have been associated with exchanging a non-variable life insurance product for a newer product (e.g., exchanging a non-variable life insurance product for a variable life insurance product, etc.). Such an exchange can only be done if a bank or corporation has insurable interest in the insured at the time of the exchange, and in most instances, an exchange cannot be used if the insured is no longer employed by the bank or corporation. In some embodiments, the instant invention allows to remedy a situation when a policy amendment can be made or life insurance rider can be added to existing BOLI and COLI products but regulations limit the amount by which the life insurance policy contract can be modified without the modification being deemed a "material change". For example, in some cases, regulations require that insurable interest requirements again be satisfied upon the event of a material change which again could generally not be satisfied for policies where the insured is no longer employed by the bank or corporation. For the above described examples, in some embodiments, the instant invention calculates a pro-rata distribution of insurance costs associated with a plurality of life insurance products based on the classification of the insured lives so that the insurance cost charges to particular insured live(s)/policy do not exceed particular allowed maximum(s) of insurance deduction(s) set in insurance contract(s) of particular policy(ies).

In some embodiments, the instant invention allows to remedy another situation when adding a new investment option is not a material change, but further modifications, such as adding insurance deductions necessary to administer the new investment option and provide the insurance carrier revenue would constitute a material change. In some embodiments, the instant invention allows banks and corporations to divest or update substantial amounts of older non-variable life insurance policies by administering the divested and/or updated products in accordance the embodiments of the instant invention described therein.

For example, in accordance with typical statistics on BOLI that was reported to bank regulators for the first quarter of 2012, $53 billion of BOLI cash value is invested in non-variable life insurance policies. This amount represents hundreds of thousands of life insurance policies issued by many insurance carriers. Some embodiments of the instant invention as detailed herein are directed to addressing the complexities associated with automatic and/or periodic processing of life insurance products of policies issued by many insurance carriers and administered on diverse non-variable life insurance systems.

Some embodiments of the instant invention as detailed herein allow administering non-variable and/or variable life insurance policies which require, at a minimum, the ability to perform daily processing and communication in order to meet the timing requirements for immediate trading of securities. For example, typically, variable life insurance policy transactions must be received by 4 PM on a business day, and those transactions along with any insurance deductions for the day must be processed and communicated to the investment manager by 10 AM the following business day and in no case later than three business days. In addition, corrections to prior processing due to errors or unreported death claims which are reported after the occurrence require undo processing back to the time of the occurrence and redo processing to the current time. All prior business day administrative processing and undo/redo processing must be completed over this limited time frame.

In most cases, transaction and insurance deduction processing may involve complex account value calculations involving many insurance product variables. In accordance with some embodiments of the instant invention, the addition of a separate account option to non-variable life insurance policies with its associated variable life insurance processing requirement along with additional processing necessary to implement different classes of a pooled separate account involves a major increase in calculations and communications over the limited time frame required for execution.

In some embodiments, the Process Administration System of the instant invention as detailed herein includes one or more computer/processors with sufficient computational power to administer, at a minimum, 3000 policies and $500 million of assets because of at least one of:

(i) such administration involves multiple insurance carrier systems with diverse structures in everything from hardware to software;

(ii) there are diverse life insurance products and no insurance industry standard with respect to life insurance product structure, terminology or methodology;

(iii) catch-up deductions calculations, representing insurance costs that are unaccounted for through insurance deductions, are complex and may involve many other life insurance product variables that must be passed under time constraints back-and-forth from the insurance carrier system to the Process Administrator System;

(iv) the Process Administrator System must be as accurate and efficient as, and have at least a processing speed equivalent to, that found in each insurance carrier system; and (v) a certain asset size must also be reached in order to realize improvements in investment returns that can be achieved using an active investment management strategy versus using a buy-and-hold strategy in order to justify investing in the pooled investment option.

In some embodiments, the instant invention allows to administer a COLI and/or BOLI product(s) that include(s) a rider that adds at least one separate account investment option with or without volatility reduction features. This is not a material change so no new insurable interest requirements must be satisfied. The instant invention is administering the non-variable life insurance products with the at least one separate account investment option which are in compliance with all Federal and/or state insurance laws and/or regulations and/or in compliance with Federal securities laws/and regulations. In some embodiments, the instant invention allows to allocate, through the classification of the insured lives, any current and/or future insurance costs necessary to administer the added separate account investment option and/or provide the insurance carrier revenue by reducing the returns of the added separate account investment option so that any insurance deductions do not exceed maximum insurance deductions set in a particular insurance contract of a particular policy.

In some embodiments, the instant invention allows to meet various insurance cost and/or revenue requirements by creating different classes of a pooled separate account investment option by classifying insured lives. In some embodiments, the invention can be used for multiple life insurance carriers and/or multiple non-variable life insurance products. In some embodiments, the processing necessary to administer a non-variable life insurance policy with at least one separate account (i.e., the variable option) with or without volatility reduction features is provided by a specifically programmed computer system of the instant invention (Process Administrator computer system), and original system processing at the policy carrier level can be retained with little modification. In some embodiments, the Process Administrator of the instant invention can also provide administrative support for the asset manager and/or the volatility reduction feature provider.

Some embodiments of the instant invention are described in FIGS. 3A and 3B. In such embodiments, 190, 200 and 210 of FIGS. 3A and 3B represent the addition of new funds with pooled volatility reduction features. In this embodiment, 220 depicts the administration provided by the Process Administrator of the instant invention.

FIG. 4 depicts another embodiment of the invention. In some embodiments, the invention includes, in combination with multiple life insurance carrier systems that do not have separate account functionality, a method for administering multiple variable life insurance products with pooled volatility reduction features.

In some embodiments, the method includes administering a non-variable life insurance policy that has been in effect for a period of time which adds a life insurance rider having separate account investment option(s), with or without pooled stability reduction feature(s), but has no other provisions that could be deemed material changes.

In some embodiments, the inventive method includes implementing the Process Administrator System that, in conjunction with the life insurance carrier system that does not have separate account functionality, and the asset manager and pooled volatility reduction provider systems, provides a method for administering a variable investment feature/option.

In some embodiments, the method includes repeating the method among multiple insurance carriers with in force blocks of multiple non-variable life insurance products having variable investment features/options. In some embodiments, the method includes repeating the method among multiple insurance carriers with in force blocks of multiple variable life insurance products.

In some embodiments, the administration of the instant invention allows to administer policy owner transactions that may be distributed among the different investment options in which the policy owner has allocated its cash value. For example, the non-variable life insurance product was originally set-up to be administered on the life insurance carrier system that did not have separate account functionality and cash value processing would be applied to a single investment option, the general account. In some embodiments, the Process Administrator system of the instant invention will add the functionality of allowing cash value to be invested in multiple investment options by distributing each policy owner transaction among the various investment options and tracking and storing the results. In an embodiment, at the time the investment options are added, the initial policy owner transaction can allocate all or a portion of the cash value to one or more of the new separate account investment options. In some embodiments, later policy owner transactions impacting cash value may include, but are not limited to, reallocations and transfers, net premium deposits, loan repayments, partial surrenders, surrenders, loans and death benefits.

In some embodiments, a life insurance carrier's non-variable life insurance policy has an interest crediting rate and insurance deduction structure which can be used to administer the separate account product created when the variable rider is added to the policy. In some embodiments, the interest crediting rate and insurance deduction structure of carrier may include, but is not limited to, interest crediting rates, cost of insurance deductions, per policy deductions, per $1000 of face amount deductions, percent of premium deductions, percent of cash value deductions and other deductions. In some embodiments, the maximum allowable insurance deduction stated in the policy allows for some, but not all, insurance costs associated with separate account investment options including, but not limited to, investment management fees, investment expenses, pooled volatility reduction feature fees, and life insurance carrier interest spreads, profits and expenses.

In other embodiments, the instant invention allows the administration when a life insurance carrier's non-variable life insurance policy may have no specific interest crediting rate or insurance deduction defined, but instead has a schedule of cash values which reflect such components. In some embodiments, total cash value may be reflected as a number of carrier system units times the cash value per carrier unit in a schedule in the insurance policy contract and possibly additional amounts credited through dividends and refunds as, for example, in the case of whole life policies.

In some embodiments, the instant invention allows the administration of the policy amendment and/or rider through the classification-based allocation so that such policy amendment and/or rider do/does not add specific insurance deduction(s) and/or other provisions potentially required to administer separate account investment options because doing so may represent a material change.

In some embodiments, separate account investment option returns may be modified and/or administered by the Process Administrator to reflect catch-up deductions which may include, but are not limited to, deductions in the form of cost of insurance deductions, percent of cash value deductions, per policy deductions, per $1000 of face amount deductions, rider deductions and other deductions potentially required to administer a life insurance policy, and additional fees and expenses associated with investments in the separate account and the pooled volatility reduction feature.

In some embodiments, the instant invention allows the administration when catch-up deductions may be banded so they vary by size. In some embodiments, the instant invention allows the administration when modified separate account investment option returns are reflected as different classes of the investment option.

In some embodiments, processing consistent with variable life products follows the results from the embodiments described above. As noted in FIG. 4, in some embodiments, a file sharing method can be implemented between the life insurance carrier system, the Process Administrator of the instant invention, the asset manager and/or the pooled volatility reduction provider. In some embodiments, the life insurance carrier passes to the Process Administrator the prior cash value, carrier system units and cash value per carrier unit, policy owner transactions, interest crediting rate and/or insurance deductions applied by the insurance carrier system and catch-up deductions on a periodic basis.

In some embodiments, the Process Administrator processes each among the different investment options and calculates revised cash values, investment option market value units, investment option stable value units and/or investment option unit values, if necessary, and creates accounting records. In some embodiments, specific items in the catch-up deductions are calculated and processed with deductions in the form of cost of insurance deductions, percent of cash value deductions, per policy deductions, per $1000 of face amount deductions, rider deductions and/or other deductions potentially required to administer a life insurance policy used for revenue sharing back to the insurance carrier, fees and expenses associated with investments in the separate account used for asset manager payments, and/or pooled volatility reduction feature fees used for pooled volatility reduction provider payments. In some embodiments, the Process Administrator stores records, and communicates information using the file sharing method, as necessary, to the life insurance carrier system, the asset manager and/or the pooled volatility reduction provider.

In some embodiments, the Process Administrator System of the instant invention, based on the determined classification of the insured lives and/or the allocation of catch-up deductions, prepares trade and/or wire instructions automatically and/or periodically for each investment option of the separate account and automatically and/or periodically passes the prepared information to each respective asset manager via the computer file sharing method. In some embodiments, the Process Administrator also tracks shares and/or share price for each investment option and/or for each class.

In some embodiments, the Process Administrator System periodically calculates interest crediting rates for each investment option of the separate account with a pooled volatility reduction feature for the pooled volatility reduction feature provider based on the classification of the insured lives. In some embodiments, Process Administrator System also calculates pooled volatility reduction feature surrender payment(s).

In some embodiments, the present invention may include a method and system for administering life insurance products as detailed herein at the asset manager level so that the life insurance carrier can continue administration on its system with minimal or no enhancements.

FIGS. 3A and 3B illustrate the administration structure of some embodiments of the instant invention. FIGS. 3A and 3B depict the administration of non-variable life insurance using the methods and systems of various embodiments of the invention.

In some embodiments, 190 represents the policy amendment or rider that adds separate account investment options to the non-variable life insurance policy, but doesn't make any other modifications that would be deemed material changes. In some embodiments, 200 represents two separate account investment options added by the rider. In some embodiments the number of separate account investment options added by the rider may be one, two, or more. In some embodiments, the separate account investment options depicted are pooled accounts, where all investor assets are combined and managed together, and where different classes are offered to policy owners to accommodate the reduction in the pooled separate account investment option return due to the subtraction of policy owners' catch-up deductions. In some embodiments, 210 represents pooled volatility reduction features and volatility reduction features offered on each investment option. In some embodiments, no volatility reduction features are present. In some embodiments, 220 represents the system and administration support provided by the Process Administrator of the instant invention for the benefits offered in 190, 200 and 210.

FIG. 4 depicts the Process Administrator System's interactions with multiple life insurance carriers, asset managers and volatility reduction providers in accordance with some embodiments of the instant invention. In some embodiments, the Process Administrator computer system utilizes insurance processing functionality of the instant invention with respect to investment options in a life insurance policy, by, automatically and/or periodically, receiving necessary data from the respective parties, processing the data, and communicating results back.

FIGS. 5A-5F illustrate some aspects of processing/administrating details related to some embodiments of the instant invention. For example, FIGS. 5A-5F summarize the additional processing/administration brought about by the addition of the separate account amendment or rider. In some embodiments, 230 depicts the impact on the life insurance carrier's non-variable system. In some embodiments, 240 depicts the processing provided by the Process Administrator and how it applies to the insurance carrier, asset manager, and/or pooled volatility reduction provider. In some embodiments, 250 depicts the impact on the asset manager.

In some embodiments, 230.1*a* describes policy owner transactions which in some embodiments apply to both whole life and universal life insurance products. Numbers in the same row, (e.g., 230.1*b*, 240.1*a*, 240.1*b*, 240.1*c* and 250.1), describe method and system processing required in some embodiments to handle policy owner transactions.

The following examples, in accordance with some embodiments of the instant invention, use terminology in FIGS. 3A, 3B and 5A-5F assuming a life insurance policy issued by Insurance Carrier W to Bank A where all cash value is allocated to Pooled Investment Options A and B and both investment options use the pooled volatility reduction feature.

Example 1

Bank A policy owner requests a $50 partial surrender with $25 from Investment Option A and $25 from Investment Option B. Insurance Carrier W processes the partial surrender into its system in 230.1a. The partial surrender is passed to the Process Administrator in 230.1b. In 240.1a, the Process Administrator of the instant invention processes the $25 Investment Option A partial surrender by calculating the number of Market Value Class AWA units the $25 represents based on current Market Value Class AWA unit values and deducts this number of units from the policy owner's Market Value Class AWA units. This process is repeated for Stable Value Class AWA units, and similarly repeated for Investment Option B. The Process Administrator processes all Bank A policy owner transactions for the day, calculates total inflows and outflows for policy owner transactions in each investment option, calculates the number of shares the total inflows and outflows represent using current share price for each investment option, and prepares trade orders for redemption or purchase of shares for each investment option. In some embodiments, the Process Administrator of the instant invention prepares and stores accounting records for each policy transaction, and results are passed to Insurance Carrier W, Asset Managers A and B, and/or the Pooled Volatility Reduction Provider.

230.2a and 230.3a, describe system processing for universal life insurance products. Other numbers along the same rows describe method and system processing required for these products.

Example 2

Suppose Insurance Carrier W issued a universal life product and its system processes a $2.50 monthly per policy deduction and a $55 monthly cost of insurance deduction from a Bank A policy total cash value in 230.2a. The insurance deductions along with directions to allocate them proportionately to the cash value in each investment option are passed to the Process Administrator in 230.2b. In 240.2a, the Process Administrator processes the $2.50 monthly per policy deduction and $55 monthly cost of insurance deduction by allocating them proportionately to the cash value in each investment option. If the policy has 25% of its cash value in Investment Option A, then 25% of each deduction is subtracted from the policy's cash value in Investment Option A by calculating the number of Market Value Class AWA units the 25% of $2.50 monthly per policy deduction represents and the 25% of $55 monthly cost of insurance deduction represents based on current Market Value Class AWA unit values and deducts these two amounts of units from the policy owner's Market Value Class AWA units. This process is repeated for Stable Value Class AWA units, and similarly repeated for Investment Option B.

In some embodiments the Process Administrator of the instant invention processes all Bank A insurance deductions for the day, calculates total inflows and outflows for insurance deductions in each investment option, calculates the number of shares the total inflows and outflows represent using current share price for each investment option, and prepares trade orders for redemption or purchase of shares for each investment option. Accounting records are prepared and stored for each insurance deduction, and results are passed to Insurance Carrier W, Asset Managers A and B, and the Pooled Volatility Reduction Provider.

Example 3

Suppose Insurance Carrier W issued a universal life insurance product and realizes a gross return on their general account assets used to set the interest crediting rate for cash value in the general account for this product at an annualized rate of 6%. Insurance Carrier W requires a 1% spread to cover certain insurance costs so they set the interest crediting rate to 6%−1%=5% (i.e., the contract required interest crediting rate). This is described in 230.3a. The only insurance costs not recovered elsewhere in the product with insurance deductions are:

(i) the interest spread of 1% to cover expenses and profits,
(ii) Investment Option A asset management expenses of 0.15% and Investment Option B asset management expenses of 0.20%, and
(iii) pooled volatility reduction feature fees of 0.25%.

The above unallocated insurance costs are passed to the Process Administrator in 230.3b. In 240.3a, based at least in part on the classification of the insured lives, the Process Administrator reduces the returns for Bank A in its Class AWA and Class BWA investment options by the appropriate catch-up deductions representing the previously unallocated insurance costs.

For Class AWA, the gross investment return of Pooled Investment Option A is reduced for catch-up deductions by a return for the period assuming the annualized reduction is the sum of the annualized spread, Investment Option A asset management expense and pooled volatility reduction feature fee for a reduction of 1%+0.15%+0.25%=1.4%. In some embodiments, this reduction could be reflected as a reduction of the appropriate amount for the period in the Market Value Class AWA unit values, or alternatively, the reduction could be reflected as a reduction in the Market Value Class AWA units.

In some embodiments, the catch-up deductions are similarly deducted from the stable value interest crediting rate to modify Stable Value Class AWA unit values, or alternatively, Stable Value Class AWA units. Similar process is repeated for Investment Option B. In some embodiments, revised cash values can be calculated by using the product of the stable value units times the stable value unit values.

In some embodiments, based at least in part on the classification of the insured lives, the Process Administrator processes all other bank's catch-up deductions for the day, calculates total inflows and outflows for catch-up deductions in each investment option, calculates the number of shares the total inflows and outflows represent using current share price for each investment option, and prepares trade orders for redemption or purchase of shares for each investment option. In some embodiments, the Process Administrator of the instant invention, prepares and stores accounting records for catch-up deductions, and transmits stored information to Insurance Carrier W, Asset Managers A and B, and/or the Pooled Volatility Reduction Provider. If Insurance Carrier W requires a revised interest crediting rate to be used for calculations on its system with the total cash value of a policy, based at least in part on the classification of the insured lives, the Process Administrator of the instant invention calculates on a policy-by-policy basis an interest crediting rate equaling a linear combination of Stable Value Class AWA and Stable Value Class BWA returns weighted by proportion of cash value in each investment option and passes the result back the Insurance Carrier W.

In 240.3*b* and 240.3*c*, the Process Administrator tracks Market Value Class AWA units and/or unit values, and Market Value Class BWA units and/or unit values for the Asset Managers for administration of classes of Pooled Investment Options A and B, and processes catch-up deductions as shares are redeemed for revenue sharing back to Insurance Carrier W, payment of investment option asset management expenses, and/or pooled volatility reduction feature fees. 230.4*a* describes system processing for whole life insurance products. Other numbers along the same row describe method and system processing required for these products.

Example 4

Suppose Insurance Carrier W issued a whole life product. There are no specified insurance deductions defined in the insurance contract. The cash value is scheduled and equals a net single premium assuming 4% interest and 80 CSO mortality, with additional amounts credited through a dividend. Insurance Carrier W makes assumptions for allocating insurance costs such as mortality costs, other benefit costs, and expenses to the policy when creating the dividend. The total insurance costs assumed in the dividend equals a spread of 2% of the cash value for a particular Bank A policy. This is described in 230.4*a*. The profit and expenses needed to be recovered with catch-up deductions are (i) the spread of 2%, (ii) Investment Option A asset management expenses of 0.15% and Investment Option B asset management expenses of 0.20%, and (iii) pooled volatility reduction feature fees of 0.25%. The catch-up deductions are passed to the Process Administrator in 230.4*b* along with carrier system units and cash value per carrier unit if such amounts need to be adjusted for Insurance Carrier W's system.

In 240.4*a*, based at least in part on the classification of the insured lives, the Process Administrator reduces the returns for the Bank A policy in its Class AWA and Class BWA investment options by the appropriate catch-up deductions. For Class AWA, the gross investment return of Pooled Investment Option A is reduced for catch-up deductions by a return for the period assuming the annualized reduction is the sum of the annualized spread, Investment Option A asset management expense and pooled volatility reduction feature fee for a reduction of 2%+0.15%+0.25%=2.4%.

In some embodiments, such reduction could be reflected by the Process Administrator of the instant invention as a reduction of the appropriate amount for the period in the Market Value Class AWA unit values, or alternatively, the reduction could be reflected as a reduction in the Market Value Class AWA units. In some embodiments, the catch-up deductions are similarly deducted by the Process Administrator of the instant invention from the stable value interest crediting rate to modify Stable Value Class AWA unit values, or alternatively, Stable Value Class AWA units. This process is repeated for Investment Option B.

In some embodiments, the Process Administrator of the instant invention calculates revised cash values by using the product of the stable value units time unit values. In some embodiments, classes for the classification can be defined for a single policy, or policies can be grouped together for determining a class. In some embodiments, based at least in part on the classification of the insured lives, the Process Administrator processes all other bank's catch-up deductions for the day, calculates total inflows and outflows for catch-up deductions in each investment option, calculates the number of shares the total inflows and outflows represent using current share price for each investment option, and prepares trade orders for redemption or purchase of shares for each investment option. In some embodiments, the Process Administrator of the instant invention, prepares and stores accounting records for catch-up deductions, and transmits stored information to Insurance Carrier W, Asset Managers A and B, and/or the Pooled Volatility Reduction Provider. If Insurance Carrier W requires revised carrier system units and/or cash value per carrier unit for the policy, based at least in part on the classification of the insured lives, the Process Administrator of the instant invention reduces by carrier system units and/or cash value per carrier unit to the appropriate value so that their product equals the revised cash value after deduction of catch-up deductions and transmits the result back the Insurance Carrier W.

In 240.4*b* and 240.4*c*, the Process Administrator tracks Market Value Class AWA units and/or unit values, and Market Value Class BWA units and/or unit values for the Asset Managers for administration of classes of Pooled Investment Options A and B, and processes, based at least in part on the classification of the insured lives, catch-up deductions as shares are redeemed for revenue sharing back to Insurance Carrier W, payment of investment option asset management expenses, and pooled volatility reduction feature fees.

It should be noted that a person having ordinary skill in the art would recognize that there are many variations of these products to which the inventive administrating is applicable such as product(s) that include(s) a blend of what has been described for the universal life insurance product and whole life insurance products above.

Example 5

In some embodiments, based at least in part on the classification of the insured lives, the Process Administrator of the instant invention tracks and stores market value and stable value over all policies in the pooled volatility reduction contracts and calculates the stable value crediting rate for the pool in 240.5*b*. For example, suppose the total market value of assets for all policies under Pooled Volatility Reduction Contract A ("MV") is $100 million, and the total stable value for all such policies ("SV") is $101 million, the yield to worst maturity ("YTM") is 6% for Pooled Investment Option A, and its duration ("D") is 3. In some embodiments, the Process Administrator calculates the Stable Value Crediting Rate for Pooled Volatility Reduction Contract A using formulas prescribed by the stable value provider which may follow a form similar to the following:

$$\text{Interest} = (1+\text{YTM})*(\text{MV/SV})^{(1/D)} - 1$$

$$\text{Interest} = (1+0.06)*(100{,}000{,}000/101{,}000{,}000)^{(1/3)} - 1 = 5.65\%$$

Illustrative Operating Computer Environments in Accordance with Some Embodiments FIG. 6 illustrates a computer system in accordance with some embodiments of the present invention. However, not all of these components may be required to practice the invention, and variations in the arrangement and type of the components may be made without departing from the spirit or scope of the invention. In some embodiment, the inventive exchange system hosts a large number of members and concurrent transactions.

In other embodiments, the inventive exchange computer system is based on a scalable computer and network architecture that incorporates varies strategies for assessing the data, caching, searching, and database connection pooling. An example of the scalable architecture is an architecture that is capable of operating multiple servers. In embodiments, the computing system in accordance with the instant invention may include, but not limiting to, one or more programmed computers, systems employing distributed networking, or other type of system that might be used to transmit and process electronic data.

In embodiments, client devices (e.g., computer systems of insurance carrier(s), asset manager(s), and/or volatility reduction provider(s)) 602-604 include virtually any computing device capable of receiving and sending a message over a network, such as network 605, to and from another computing device, such as servers (e.g., the Process Administrator) 606 and 607, each other, and the like. In embodiments, the set of such devices includes devices that typically connect using a wired communications medium such as personal computers, multiprocessor systems, microprocessor-based or programmable consumer electronics, network PCs, and the like. In embodiments, the set of such devices also includes devices that typically connect using a wireless communications medium such as cell phones, smart phones, pagers, walkie talkies, radio frequency (RF) devices, infrared (IR) devices, CBs, integrated devices combining one or more of the preceding devices, or virtually any mobile device, and the like. Similarly, in embodiments, client devices 602-604 are any device that is capable of connecting using a wired or wireless communication medium such as a PDA, POCKET PC, wearable computer, and any other device that is equipped to communicate over a wired and/or wireless communication medium.

In embodiments, client devices 602-604 are further configured to receive a message from the another computing device employing another mechanism, including, but not limited to email, Short Message Service (SMS), Multimedia Message Service (MMS), instant messaging (IM), internet relay chat (IRC), mIRC, Jabber, and the like.

In embodiments, network 605 is configured to couple one computing device to another computing device to enable them to communicate. In embodiments, network 605 is enabled to employ any form of computer readable media for communicating information from one electronic device to another. Also, in embodiments, network 605 includes a wireless interface, and/or a wired interface, such as the Internet, in addition to local area networks (LANs), wide area networks (WANs), direct connections, such as through a universal serial bus (USB) port, other forms of computer-readable media, or any combination thereof. In embodiments, on an interconnected set of LANs, including those based on differing architectures and protocols, a router acts as a link between LANs, enabling messages to be sent from one to another.

Also, in some embodiments, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, in embodiments, remote computers and other related electronic devices could be remotely connected to either LANs or WANs via a modem and temporary telephone link. In essence, in embodiments, network 605 includes any communication method by which information may travel between client devices 602-604, and servers 606 and 607.

Figure 7:
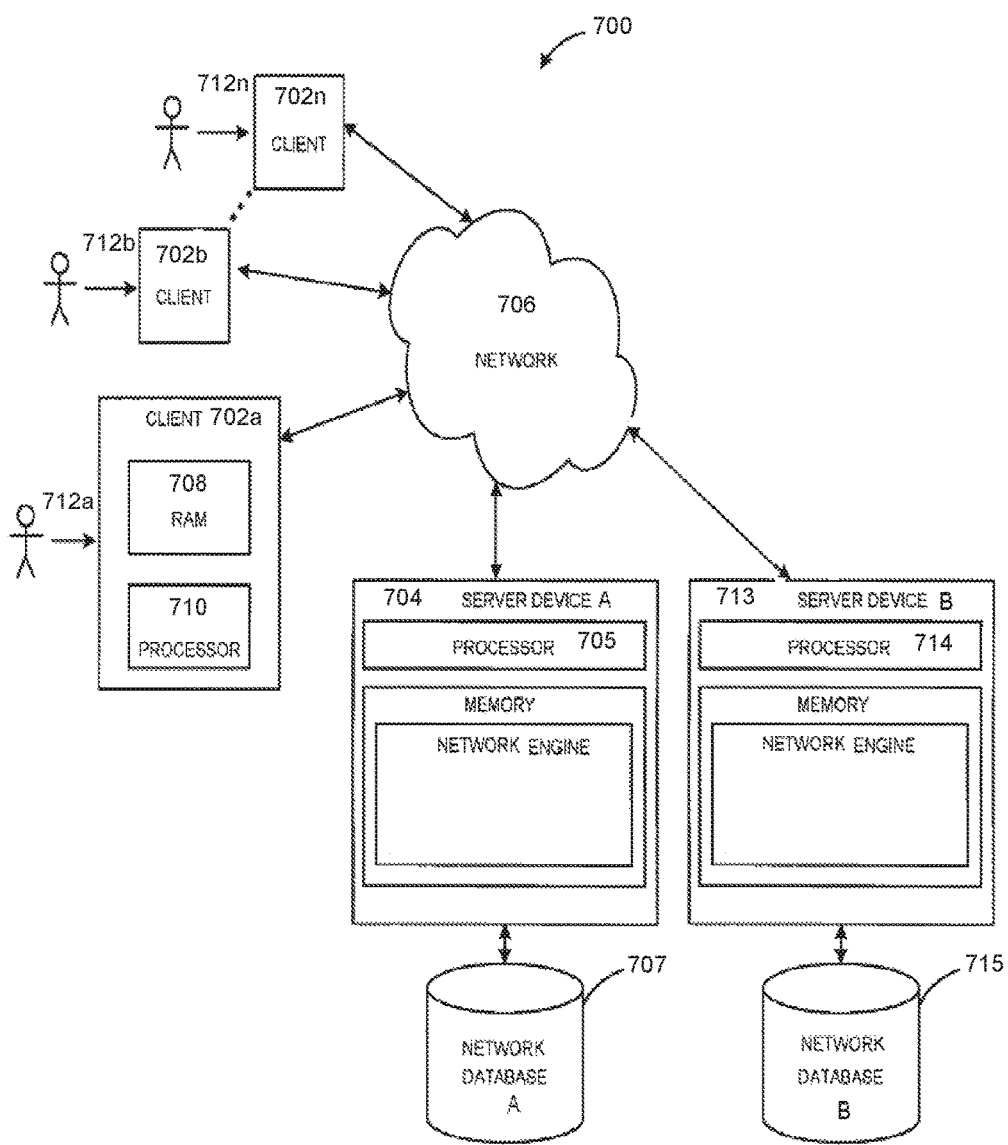
FIG. 7 illustrates yet another embodiment of the exchange computer and network architecture.

FIG. 7 shows another exemplary embodiment of the exchange computer and network architecture that supports a computer exchange system in accordance with some embodiments of the instant invention. The client devices 702*a*, 702*b* thru 702*n* (e.g., computer systems of insurance carrier(s), asset manager(s), and/or volatility reduction provider(s)) shown each comprises a computer-readable medium, such as a random access memory (RAM) 708 coupled to a processor 710. The processor 710 executes computer-executable program instructions stored in memory 708. Such processors comprise a microprocessor, an ASIC, and state machines. Such processors comprise, or are be in communication with, media, for example computer-readable media, which stores instructions that, when executed by the processor, cause the processor to perform the steps described herein. Embodiments of computer-readable media include, but are not limited to, an electronic, optical, magnetic, or other storage or transmission device capable of providing a processor, such as the processor 710 of client 702*a*, with computer-readable instructions. Other examples of suitable media include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media transmit or carry instructions to a computer, including a router, private or public network, or other transmission device or channel, both wired and wireless. The instructions comprise code from any computer-programming language, including, for example, C, C++, C#, Visual Basic, Java, Python, Perl, and JavaScript.

Client devices 702*a-n* also comprise a number of external or internal devices such as a mouse, a CD-ROM, DVD, a keyboard, a display, or other input or output devices. Examples of client devices 702*a-n* are personal computers, digital assistants, personal digital assistants, cellular phones, mobile phones, smart phones, pagers, digital tablets, laptop computers, Internet appliances, and other processor-based devices. In general, a client device 702*a* is any type of processor-based platform that is connected to a network 706 and that interacts with one or more application programs. Client devices 702*a-n* operate on any operating system capable of supporting a browser or browser-enabled application, such as Microsoft™, Windows™, or Linux. The client devices 702*a-n* shown include, for example, personal computers executing a browser application program such as Microsoft Corporation's Internet Explorer™, Apple Computer, Inc.'s Safari™, Mozilla Firefox, and Opera.

Through the client devices 702*a-n*, insurance carrier(s), asset manager(s), and/or volatility reduction provider(s) 712*a-n* communicate over the network 706 with each other and with other systems and devices coupled to the network 706. As shown in FIG. 7, server devices 704 and 713 (e.g., the Process Administrator) are also coupled to the network 706.

Of note, the embodiments described herein may, of course, be implemented using any appropriate computer system hardware and/or computer system software. In this regard, those of ordinary skill in the art are well versed in the type of computer hardware that may be used (e.g., a mainframe, a mini-computer, a personal computer ("PC"), a network (e.g., an intranet and/or the internet)), the type of computer programming techniques that may be used (e.g., object oriented programming), and the type of computer programming languages that may be used (e.g., C++, Basic, AJAX, Javascript). The aforementioned examples are, of course, illustrative and not restrictive.

In some embodiments, the instant invention is directed to a computer-implemented method that at least includes: programming a Process Administrator computer system to perform at least: receiving life insurance data for a plurality of life insurance policies associated with: (i) at least two policy owners, and (ii) at least 3000 insured lives and/or at least $500 million of assets; identifying, from the plurality of life insurance policies, at least one first life insurance policy that has at least one first catch-up deduction where the at least one first catch-up deduction equals at least one first insurance cost that exceeds at least one first maximum allowed insurance deduction that is deductible under the at least one first life insurance policy; classifying the insured lives of the at least one first life insurance policy into a plurality of insured classes of the insured lives; determining, based on variable life insurance data of the life insurance data, at least one first investment amount in at least one first separate account associated with the plurality of life insurance policies identified in the variable life insurance data; receiving investment data resulted from investing, in at least one first investment option, at least a portion of the at least one first investment amount; calculating at least one first investment return amount attributed to the at least one first life insurance policy based, at least in part, on: i) the investment data, and ii) a portion of the at least one first investment amount of the at least one first separate account that is attributed to the at least one first life insurance policy; determining at least one first net investment return amount to be credited to the at least one first life insurance policy based, at least in part, on: i) at least one first insured class from plurality of insured classes of the insured lives, ii) the at least one first investment return amount, and iii) the at least one first catch-up deduction; and transmitting the at least one first net investment return amount so as to result in crediting the at least one first net investment return amount to the at least one first life insurance policy.

In some embodiments, the Process Administrator computer system is programmed to further perform at least: allocating, to the at least one first life insurance policy, at least a portion of at least one first investment cost resulting from the investing so as to determine at least one first net investment return amount based, at least in part, on: i) the at least one first insured class of at least one first insured life, and ii) the investment data, and iii) a first allocation condition that a first sum of the at least one first catch-up deduction and the allocated portion of the at least one first investment cost is greater than the at least one first maximum allowed insurance deduction that is deductible under the at least one first life insurance policy; and wherein the determining, the at least one first net investment return amount to be credited to the at least one first life insurance policy further based, at least in part, on: iv) the first sum of the at least one first catch-up deduction and the allocated portion of the at least one first investment cost.

In some embodiments, the determining the at least one first investment amount further includes deducting, for the at least one first life insurance policy, at least one of: i) the at least one first insurance deduction and ii) at least one transaction amount.

In some embodiments, the determining the at least one first net investment return amount to be credited to the at least one first life insurance policy further includes: transmitting at least one first sell instruction to satisfy the at least one first catch-up deduction, and transmitting at least one first instruction to utilize an amount of the at least one first catch-up deduction to be deducted from the at least one first investment return amount for at least one first revenue share payment to a life insurance carrier associated with the at least one first life insurance policy.

In some embodiments, the at least one investment option comprises an actively managed investment strategy. In some embodiments, the actively managed investment strategy comprises at least one pooled volatility reduction feature. In some embodiments, the determining the at least one first net investment return amount to be credited to the at least one first life insurance policy is performed within 3 business days after the investment data is received.

In some embodiments, the determining the at least one first net investment return amount to be credited to the at least one first life insurance policy is performed within 3 business days after the investment data is received. In some embodiments, the steps are performed on a pre-determined periodic time basis. In some embodiments, the steps are performed on each time the life insurance data is received. In some embodiments, the life insurance data comprises at least one of the following: (a) allocations, (b) net premium deposits, (c) loan repayments, (d) partial surrenders, (e) surrenders, (f) loans, (g) death benefits, (h) transfers between investment alternatives, (i) insurance deductions, and (j) catch-up deductions. In some embodiments, the at least one first catch-up deduction is one of the following: (a) cost of insurance deduction, (b) policy fee deduction, (c) per thousand of face amount deduction, (d) percent of cash value deduction, (e) other deduction, and (f) rider deduction.

In some embodiments, the at least one first catch-up deduction is derived from a plurality of catch-up deductions that are banded or modified based on at least one second policy characteristic associated with the plurality of life insurance policies. In some embodiments, the determining the at least one first net investment return amount to be credited to the at least one first life insurance policy further comprises at least one of: changing at least one first interest crediting rate applied to a cash value of the at least one first life insurance policy; changing at least one first carrier system unit value or a number of units established by a life insurance carrier for the at least one first life insurance policy; and changing at least one first carrier system cash value of the at least one first particular life insurance policy.

In some embodiments, the instant invention is directed to another computer-implemented method that at least includes: programming a Process Administrator computer system to perform at least: receiving life insurance data for a plurality of life insurance policies associated with: (i) at least two life insurance carriers, and (ii) at least 3000 insured lives and/or at least $500 million of assets; identifying, from the plurality of life insurance policies, at least one first life insurance policy that has at least one first catch-up deduction where the at least one first catch-up deduction equals at least one first insurance cost that exceeds at least one first maximum allowed insurance deduction that is deductible under the at least one first life insurance policy; classifying the insured lives of the at least one first life insurance policy into a plurality of insured classes of the insured lives; determining, based on variable life insurance data of the life insurance data, at least one first investment amount in at least one first separate account associated with the plurality of life insurance policies identified in the variable life insurance data; receiving investment data resulted from investing, in at least one first investment option, at least a portion of the at least one first investment amount; calculating at least one first investment return amount attributed to the at least one first life insurance policy based, at least in part, on: i) the investment data, and ii) a portion of the at least one first investment amount of the at least one first separate account that is attributed to the at least one first life insurance policy; determining at least one first net investment return amount to be credited to the at least one first life insurance policy based, at least in part, on: i) at least one first insured class from plurality of insured classes of the insured lives, ii) the at least one first investment return amount, and iii) the at least one first catch-up deduction; and transmitting the at least one first net investment return amount so as to result in crediting the at least one first net investment return amount to the at least one first life insurance policy.

In some embodiments, the instant invention is directed to a computerized system for monitoring investment trading of shares of at least one mutual fund that at least includes: at least one computer having a non-transient computer tangible readable medium having stored thereon software instructions executable by at least one processor of the computer that at least include: code to program a Process Administrator computer system to perform at least: receiving life insurance data for a plurality of life insurance policies associated with: (i) at least two policy owners, and (ii) at least 3000 insured lives and/or at least $500 million of assets; identifying, from the plurality of life insurance policies, at least one first life insurance policy that has at least one first catch-up deduction where the at least one first catch-up deduction equals at least one first insurance cost that exceeds at least one first maximum allowed insurance deduction that is deductible under the at least one first life insurance policy; classifying the insured lives of the at least one first life insurance policy into a plurality of insured classes of the insured lives; determining, based on variable life insurance data of the life insurance data, at least one first investment amount in at least one first separate account associated with the plurality of life insurance policies identified in the variable life insurance data; receiving investment data resulted from investing, in at least one first investment option, at least a portion of the at least one first investment amount; calculating at least one first investment return amount attributed to the at least one first life insurance policy based, at least in part, on: i) the investment data, and ii) a portion of the at least one first investment amount of the at least one first separate account that is attributed to the at least one first life insurance policy; determining at least one first net investment return amount to be credited to the at least one first life insurance policy based, at least in part, on: i) at least one first insured class from plurality of insured classes of the insured lives, ii) the at least one first investment return amount, and iii) the at least one first catch-up deduction; and transmitting the at least one first net investment return amount so as to result in crediting the at least one first net investment return amount to the at least one first life insurance policy.

In some embodiments, the instant invention is directed to another computerized system for monitoring investment trading of shares of at least one mutual fund that at least includes: at least one computer having a non-transient computer tangible readable medium having stored thereon software instructions executable by at least one processor of the computer that at least include: code to program a Process Administrator computer system to perform at least: receiving life insurance data for a plurality of life insurance policies associated with: (i) at least two life insurance carriers, and (ii) at least 3000 insured lives and/or at least $500 million of assets; identifying, from the plurality of life insurance policies, at least one first life insurance policy that has at least one first catch-up deduction where the at least one first catch-up deduction equals at least one first insurance cost that exceeds at least one first maximum allowed insurance deduction that is deductible under the at least one first life insurance policy; classifying the insured lives of the at least one first life insurance policy into a plurality of insured classes of the insured lives; determining, based on variable life insurance data of the life insurance data, at least one first investment amount in at least one first separate account associated with the plurality of life insurance policies identified in the variable life insurance data; receiving investment data resulted from investing, in at least one first investment option, at least a portion of the at least one first investment amount; calculating at least one first investment return amount attributed to the at least one first life insurance policy based, at least in part, on: i) the investment data, and ii) a portion of the at least one first investment amount of the at least one first separate account that is attributed to the at least one first life insurance policy; determining at least one first net investment return amount to be credited to the at least one first life insurance policy based, at least in part, on: i) at least one first insured class from plurality of insured classes of the insured lives, ii) the at least one first investment return amount, and iii) the at least one first catch-up deduction; and transmitting the at least one first net investment return amount so as to result in crediting the at least one first net investment return amount to the at least one first life insurance policy.

While a number of embodiments of the present invention have been described, it is understood that these embodiments are illustrative only, and not restrictive, and that many modifications may become apparent to those of ordinary skill in the art. Further still, the various steps may be carried out in any desired order (and any desired steps may be added and/or any desired steps may be eliminated).

What is claimed is:

1. A computer-implemented method, comprising:
electronically receiving, by a specifically programmed Process Administrator computer processor executing software specifically programmed to perform the method, life insurance data for a plurality of life insurance policies associated with:
(i) at least two policy owners, and
(ii) at least 3000 insured lives and/or at least $500 million of assets;
wherein the specifically programmed Process Administrator computer processor is a processing unit of a networked computer device specifically dedicated to execute the software which has been specifically programmed to perform the method;
automatically identifying, by the specifically programmed Process Administrator computer processor, from the plurality of life insurance policies, at least one first life insurance policy that has at least one first catch-up deduction where the at least one first catch-up deduction equals at least one first insurance cost that exceeds at least one first maximum allowed insurance deduction that is deductible under the at least one first life insurance policy;
automatically classifying, by the specifically programmed Process Administrator computer processor, the insured lives of the at least one first life insurance policy into a plurality of insured classes of the insured lives;
automatically determining, by the specifically programmed Process Administrator computer processor, based on variable life insurance data of the life insurance data, at least one first investment amount in at least one first separate account associated with the plurality of life insurance policies identified in the variable life insurance data;
electronically receiving, by the specifically programmed Process Administrator computer processor, investment data resulted from investing, in at least one first investment option, at least a portion of the at least one first investment amount;
automatically calculating, by the specifically programmed Process Administrator computer processor, at least one first investment return amount attributed to the at least one first life insurance policy based, at least in part, on:
i) the investment data, and
ii) a portion of the at least one first investment amount of the at least one first separate account that is attributed to the at least one first life insurance policy;
automatically determining, by the specifically programmed Process Administrator computer processor, at least one first net investment return amount to be credited to the at least one first life insurance policy based, at least in part, on:
i) at least one first insured class from plurality of insured classes of the insured lives,
ii) the at least one first investment return amount, and
iii) the at least one first catch-up deduction; and
electronically transmitting, by the specifically programmed Process Administrator computer processor, the at least one first net investment return amount so as to result in crediting the at least one first net investment return amount to the at least one first life insurance policy.

2. The computer-implemented method of claim 1, further comprising:
automatically allocating, by the specifically programmed Process Administrator computer processor, to the at least one first life insurance policy, at least a portion of at least one first investment cost resulting from the investing so as to determine at least one first net investment return amount based, at least in part, on:
i) the at least one first insured class of at least one first insured life, and
ii) the investment data, and
iii) a first allocation condition that a first sum of the at least one first catch-up deduction and the allocated portion of the at least one first investment cost is greater than the at least one first maximum allowed insurance deduction that is deductible under the at least one first life insurance policy; and
wherein the determining, the at least one first net investment return amount to be credited to the at least one first life insurance policy further based, at least in part, on:
iv) the first sum of the at least one first catch-up deduction and the allocated portion of the at least one first investment cost.

3. The computer-implemented method of claim 1, wherein the determining, by the specifically programmed Process Administrator computer processor, the at least one first investment amount further comprises:
automatically deducting, by the specifically programmed Process Administrator computer processor, for the at least one first life insurance policy, at least one of:
i) the at least one first insurance deduction and
ii) at least one transaction amount.

4. The computer-implemented method of claim 1, wherein the determining, by the specifically programmed Process Administrator computer processor, the at least one first net investment return amount to be credited to the at least one first life insurance policy further comprises:
electronically transmitting, by the specifically programmed Process Administrator computer processor, at least one first sell instruction to satisfy the at least one first catch-up deduction, and
electronically transmitting, by the specifically programmed Process Administrator computer processor, at least one first instruction to utilize an amount of the at least one first catch-up deduction to be deducted from the at least one first investment return amount for at least one first revenue share payment to a life insurance carrier associated with the at least one first life insurance policy.

5. The computer-implemented method of claim 1, wherein the determining, by the specifically programmed Process Administrator computer processor, the at least one first net investment return amount to be credited to the at least one first life insurance policy is performed within 3 business days after the investment data is received.

6. The computer-implemented method of claim 2, wherein the determining, by the specifically programmed Process Administrator computer processor, the at least one first net investment return amount to be credited to the at least one first life insurance policy is performed within 3 business days after the investment data is received.

7. The computer-implemented method of claim 1, wherein the steps are performed on a pre-determined periodic time basis.

8. The computer-implemented method of claim 4, wherein the at least one first catch-up deduction is one of the following:
(a) cost of insurance deduction,
(b) policy fee deduction,
(c) per thousand of face amount deduction,
(d) percent of cash value deduction,
(e) other deduction, and
(f) rider deduction.

9. The computer-implemented method of claim 1, wherein the at least one first catch-up deduction is derived from a plurality of catch-up deductions that are banded or modified based on at least one second policy characteristic associated with the plurality of life insurance policies.

10. The computer-implemented method of claim 1, wherein the determining, by the specifically programmed Process Administrator computer processor, the at least one first net investment return amount to be credited to the at least one first life insurance policy further comprises at least one of:
automatically changing, by the specifically programmed Process Administrator computer processor, at least one first interest crediting rate applied to a cash value of the at least one first life insurance policy;
automatically changing, by the specifically programmed Process Administrator computer processor, at least one first carrier system unit value or a number of units established by a life insurance carrier for the at least one first life insurance policy; and
automatically changing, by the specifically programmed Process Administrator computer processor, at least one first carrier system cash value of the at least one first particular life insurance policy.

11. A computer-implemented method, comprising:
electronically receiving, by a specifically programmed Process Administrator computer processor executing software specifically programmed to perform the method, life insurance data for a plurality of life insurance policies associated with:
(i) at least two life insurance carriers, and
(ii) at least 3000 insured lives and/or at least $500 million of assets;
wherein the specifically programmed Process Administrator computer processor is a processing unit of a network server device specifically dedicated to execute the software which has been specifically programmed to perform the method;
automatically identifying, by the specifically programmed Process Administrator computer processor, from the plurality of life insurance policies, at least one first life insurance policy that has at least one first catch-up deduction where the at least one first catch-up deduction equals at least one first insurance cost that exceeds at least one first maximum allowed insurance deduction that is deductible under the at least one first life insurance policy;
automatically classifying, by the specifically programmed Process Administrator computer processor, the insured lives of the at least one first life insurance policy into a plurality of insured classes of the insured lives;
automatically determining, by the specifically programmed Process Administrator computer processor, based on variable life insurance data of the life insurance data, at least one first investment amount in at least one first separate account associated with the plurality of life insurance policies identified in the variable life insurance data;
electronically receiving, by the specifically programmed Process Administrator computer processor, investment data resulted from investing, in at least one first investment option, at least a portion of the at least one first investment amount;
automatically calculating, by the specifically programmed Process Administrator computer processor, at least one first investment return amount attributed to the at least one first life insurance policy based, at least in part, on:
i) the investment data, and
ii) a portion of the at least one first investment amount of the at least one first separate account that is attributed to the at least one first life insurance policy;
automatically determining, by the specifically programmed Process Administrator computer processor, at least one first net investment return amount to be credited to the at least one first life insurance policy based, at least in part, on:
i) at least one first insured class from plurality of insured classes of the insured lives,
ii) the at least one first investment return amount, and
iii) the at least one first catch-up deduction; and
electronically transmitting, by the specifically programmed Process Administrator computer processor, the at least one first net investment return amount so as to result in crediting the at least one first net investment return amount to the at least one first life insurance policy.

12. The computer-implemented method of claim 11, further comprising:
automatically allocating, by the specifically programmed Process Administrator computer processor, to the at least one first life insurance policy, at least a portion of at least one first investment cost resulting from the investing so as to determine at least one first net investment return amount based, at least in part, on:
i) the at least one first insured class of at least one first insured life, and
ii) the investment data, and
iii) a first allocation condition that a first sum of the at least one first catch-up deduction and the allocated portion of the at least one first investment cost is greater than the at least one first maximum allowed insurance deduction that is deductible under the at least one first life insurance policy; and
wherein the determining, by the specifically programmed Process Administrator computer processor, the at least one first net investment return amount to be credited to the at least one first life insurance policy further based, at least in part, on:
iv) the first sum of the at least one first catch-up deduction and the allocated portion of the at least one first investment cost.

13. The computer-implemented method of claim 11, wherein the determining, by the specifically programmed Process Administrator computer processor, the at least one first investment amount further comprises:
automatically deducting, by the specifically programmed Process Administrator computer processor, for the at least one first life insurance policy, at least one of:
i) the at least one first insurance deduction and
ii) at least one transaction amount.

14. The computer-implemented method of claim 11, wherein the determining, by the specifically programmed Process Administrator computer processor, the at least one first net investment return amount to be credited to the at least one first life insurance policy further comprises:
electronically transmitting, by the specifically programmed Process Administrator computer processor, at least one first sell instruction to satisfy the at least one first catch-up deduction, and
electronically transmitting, by the specifically programmed Process Administrator computer processor, at least one first instruction to utilize an amount of the at least one first catch-up deduction to be deducted from the at least one first investment return amount for at least one first revenue share payment to a life insurance carrier associated with the at least one first life insurance policy.

15. The computer-implemented method of claim 11, wherein the determining, by the specifically programmed Process Administrator computer processor, the at least one first net investment return amount to be credited to the at least one first life insurance policy is performed within 3 business days after the investment data is received.

16. The computer-implemented method of claim 12, wherein the determining, by the specifically programmed Process Administrator computer processor, the at least one first net investment return amount to be credited to the at least one first life insurance policy is performed within 3 business days after the investment data is received.

17. The computer-implemented method of claim 11, wherein the steps are performed on a pre-determined periodic time basis.

18. The computer-implemented method of claim 14, wherein the at least one first catch-up deduction is one of the following:
(a) cost of insurance deduction,
(b) policy fee deduction,
(c) per thousand of face amount deduction,
(d) percent of cash value deduction,
(e) other deduction, and
(f) rider deduction.

19. The computer-implemented method of claim 11, wherein the at least one first catch-up deduction is derived from a plurality of catch-up deductions that are banded or modified based on at least one second policy characteristic associated with the plurality of life insurance policies.

20. The computer-implemented method of claim 11, wherein the determining, by the specifically programmed Process Administrator computer processor, the at least one first net investment return amount to be credited to the at least one first life insurance policy further comprises at least one of:
   automatically changing, by the specifically programmed Process Administrator computer processor, at least one first interest crediting rate applied to a cash value of the at least one first life insurance policy;
   automatically changing, by the specifically programmed Process Administrator computer processor, at least one first carrier system unit value or a number of units established by a life insurance carrier for the at least one first life insurance policy; and
   automatically changing, by the specifically programmed Process Administrator computer processor, at least one first carrier system cash value of the at least one first particular life insurance policy.

21. A specifically programmed Process Administrator computer system, comprising:
   at least one specialized Process Administrator computer machine, comprising:
   at least one networked computer device dedicated to execute particular computer executable program code, wherein the at least one networked computer device comprises:
   a non-transient memory, electronically storing the particular computer executable program code; and
   at least one computer processor unit which, when executing the particular computer executable program code, becomes a specifically programmed computing processor that is configured to at least perform the following operations:
   electronically receiving life insurance data for a plurality of life insurance policies associated with:
      (i) at least two policy owners, and
      (ii) at least 3000 insured lives and/or at least $500 million of assets;
   automatically identifying, from the plurality of life insurance policies, at least one first life insurance policy that has at least one first catch-up deduction where the at least one first catch-up deduction equals at least one first insurance cost that exceeds at least one first maximum allowed insurance deduction that is deductible under the at least one first life insurance policy;
   automatically classifying the insured lives of the at least one first life insurance policy into a plurality of insured classes of the insured lives;
   automatically determining, based on variable life insurance data of the life insurance data, at least one first investment amount in at least one first separate account associated with the plurality of life insurance policies identified in the variable life insurance data;
   electronically receiving investment data resulted from investing, in at least one first investment option, at least a portion of the at least one first investment amount;
   automatically calculating at least one first investment return amount attributed to the at least one first life insurance policy based, at least in part, on:
      i) the investment data, and
      ii) a portion of the at least one first investment amount of the at least one first separate account, that is attributed to the at least one first life insurance policy;
   automatically determining at least one first net investment return amount to be credited to the at least one first life insurance policy based, at least in part, on:
      i) at least one first insured class from plurality of insured classes of the insured lives,
      ii) the at least one first investment return amount, and
      iii) the at least one first catch-up deduction; and
   electronically transmitting the at least one first net investment return amount so as to result in crediting the at least one first net investment return amount to the at least one first life insurance policy.

22. A specifically programmed Process Administrator computer system, comprising:
   at least one specialized Process Administrator computer machine, comprising:
   at least one networked computer device dedicated to execute particular computer executable program code, wherein the at least one networked computer device comprises:
   a non-transient memory, electronically storing the particular computer executable program code; and
   at least one computer processor unit which, when executing the particular computer executable program code, becomes a specifically programmed computing processor that is configured to at least perform the following operations:
   electronically receiving life insurance data for a plurality of life insurance policies associated with:
      (i) at least two life insurance carriers, and
      (ii) at least 3000 insured lives and/or at least $500 million of assets;
   automatically identifying, from the plurality of life insurance policies, at least one first life insurance policy that has at least one first catch-up deduction where the at least one first catch-up deduction equals at least one first insurance cost that exceeds at least one first maximum allowed insurance deduction that is deductible under the at least one first life insurance policy;
   automatically classifying the insured lives of the at least one first life insurance policy into a plurality of insured classes of the insured lives;
   automatically determining based on variable life insurance data of the life insurance data, at least one first investment amount in at least one first separate account associated with the plurality of life insurance policies identified in the variable life insurance data;
   electronically receiving investment data resulted from investing, in at least one first investment option, at least a portion of the at least one first investment amount;
   automatically calculating at least one first investment return amount attributed to the at least one first life insurance policy based, at least in part, on:
      i) the investment data, and
      ii) a portion of the at least one first investment amount of the at least one first separate account that is attributed to the at least one first life insurance policy;
   automatically determining at least one first net investment return amount to be credited to the at least one first life insurance policy based, at least in part, on:

i) at least one first insured class from plurality of insured classes of the insured lives,
ii) the at least one first investment return amount, and
iii) the at least one first catch-up deduction; and electronically transmitting the at least one first net investment return amount so as to result in crediting the at least one first net investment return amount to the at least one first life insurance policy.

* * * * *